(12) United States Patent
Nakazawa

(10) Patent No.: US 6,701,031 B2
(45) Date of Patent: Mar. 2, 2004

(54) ACOUSTO-OPTICAL TUNABLE FILTER, METHOD OF DRIVING THE SAME, AND OPTICAL ADD/DROP MULTIPLEXER

(75) Inventor: Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 22 days.

(21) Appl. No.: 09/915,589

(22) Filed: Jul. 27, 2001

(65) Prior Publication Data

US 2002/0041721 A1 Apr. 11, 2002

(30) Foreign Application Priority Data

Jul. 28, 2000 (JP) ........................................ 2000-229754

(51) Int. Cl.$^7$ .................... G02F 1/335; G02B 6/00; H04J 14/02
(52) U.S. Cl. ................ 385/7; 385/11; 359/127
(58) Field of Search ...................... 385/7, 11; 359/127

(56) References Cited

U.S. PATENT DOCUMENTS

| | | | |
|---|---|---|---|
| 5,173,794 A | * 12/1992 | Cheung et al. | 359/127 |
| 5,329,397 A | * 7/1994 | Chang | 359/308 |
| 5,357,097 A | * 10/1994 | Shiozawa et al. | 250/205 |
| 5,796,882 A | * 8/1998 | Schmid | 385/11 |
| 6,370,308 B1 | * 4/2002 | Nakazawa et al. | 385/132 |
| 6,411,748 B1 | * 6/2002 | Foltzer | 385/7 |

OTHER PUBLICATIONS

Song, G. Hugh, "Time–Dependent Analysis of Acousto–Optic Tunable Filters for Multichannel Optical Switching", *Journal of Lightwave Technology*, vol. 15., No. 3, Mar. 1997.

Jackel, Janet L. et al., Multichannel Operation of AOTF Switches: Reducing Channel–to–Channel Interaction, *IEEE Photonics Technology Letters*, vol. 7, No. 4, Apr. 1995.

Jackel, Janet L. et al., "Acousto–Optic Tunable Filters (AOTF's) for Multiwavelength Optical Cross–Connects: Crosstalk Considerations", *Journal of Lightwave Technology*, vol. 14, No. 6, Jun. 1996.

* cited by examiner

Primary Examiner—Brian Healy
Assistant Examiner—Tina Lin
(74) Attorney, Agent, or Firm—Staas & Halsey LLP

(57) ABSTRACT

An acousto-optical tunable filter capable of appropriately filtering lights with a plurality of frequencies, a method of driving the same, and an optical add/drop multiplexer using the same. The acousto-optical tunable filter includes a signal source which supplies an RF frequency to the acousto-optical tunable filter; a control part which controls the RF frequency of the signal source; and a compensation part which determines an RF frequency for selecting one light from a plurality of lights with different frequencies from each other by adding/subtracting a predetermined compensation amount to/from an RF frequency for selecting only one light, when selecting the plurality of lights in the acousto-optical tunable filter, determines all of a plurality of RF frequencies for selecting the plurality of lights, and designates the control part to oscillate the determined RF frequencies.

29 Claims, 21 Drawing Sheets

Structure of AOTF according to first embodiment

Structure of AOTF according to first embodiment

First simulation result of predetermined compensation amount (wavelength interval of 1.6nm)

Second simulation result of predetermined compensation amount (wavelength interval of 1.6nm)

FIG.5 Second simulation result of predetermined compensation amount (wavelength interval of 3.2nm)

FIG.6
Explanatory views of method of determining predetermined compensation amount by superposition
A.
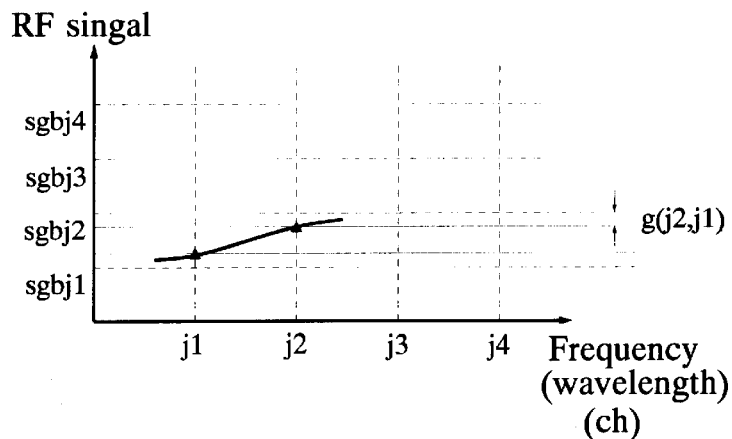
B.
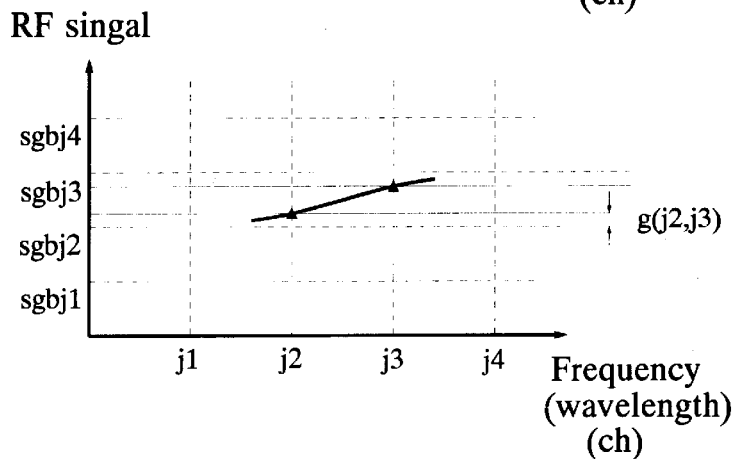
C.
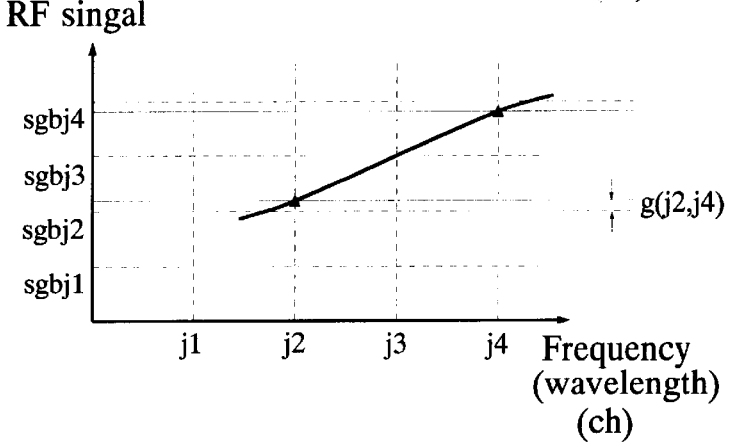
$\Delta f_{j2,j1j2j3j4} = g(j2,j1) + g(j2,j3) + g(j2,j4)$ Structure of optical communication system according to second embodiment Structure of OADM in optical communication system according to second embodiment Relationship between inverse of frequency interval of channels and to-be-compensated amount in AOTF according to second embodiment

FIG.10
Comparision between measurment result of predetermined compensation amount and calculation result of formula 2 and formula 3
A.
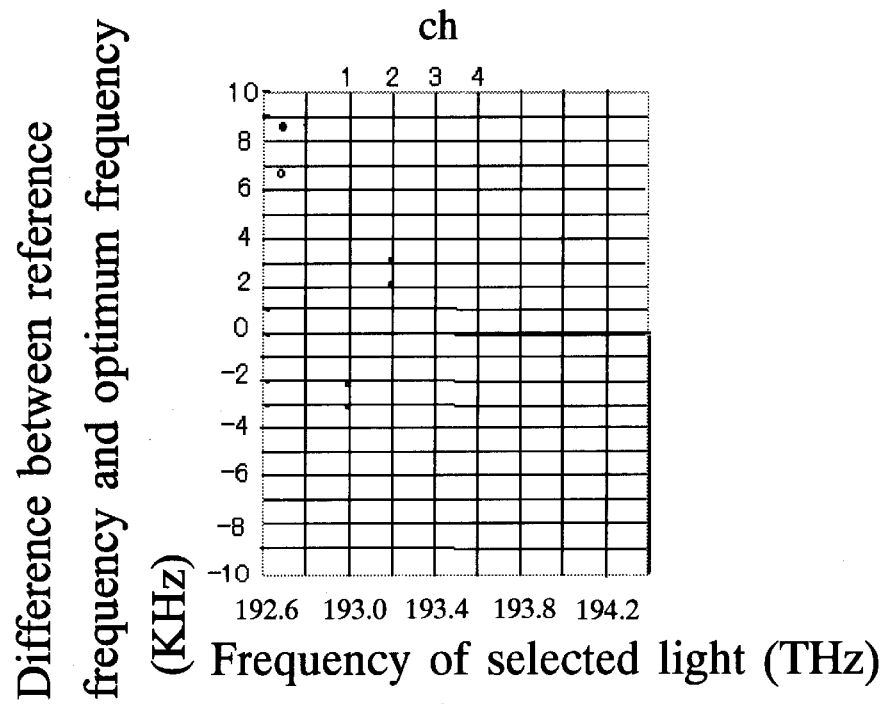
B.
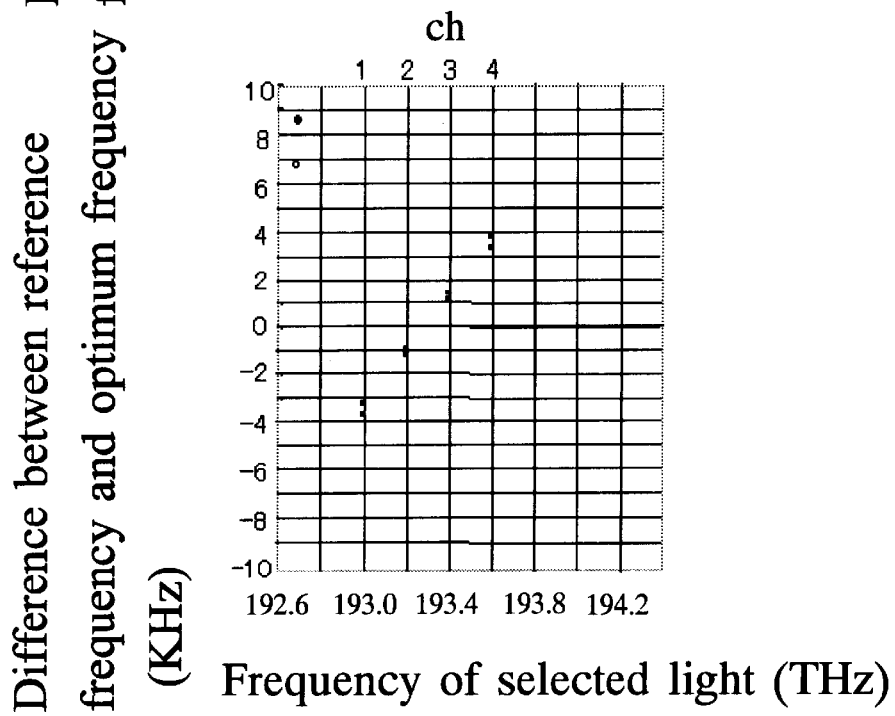

FIG.11
Characteristic of port Pdr of OADM according to second embodiment
A.
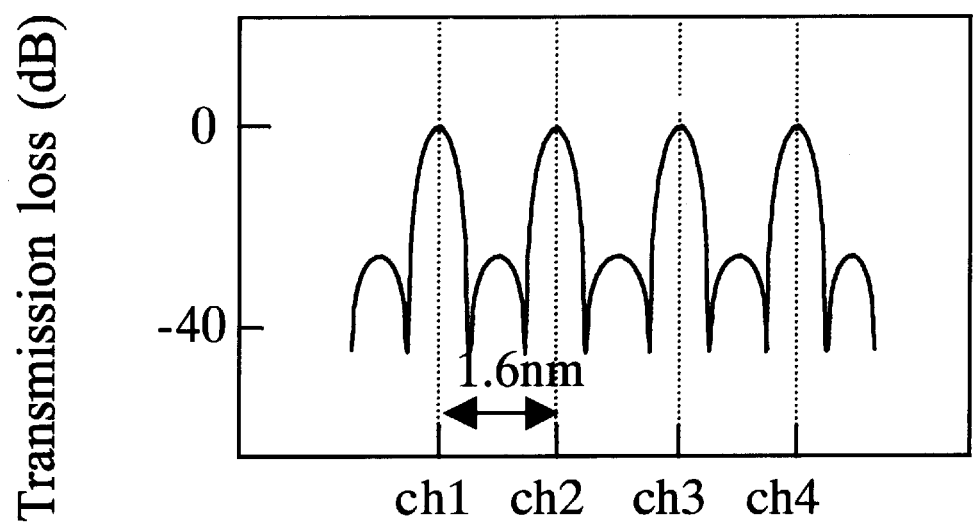
B.
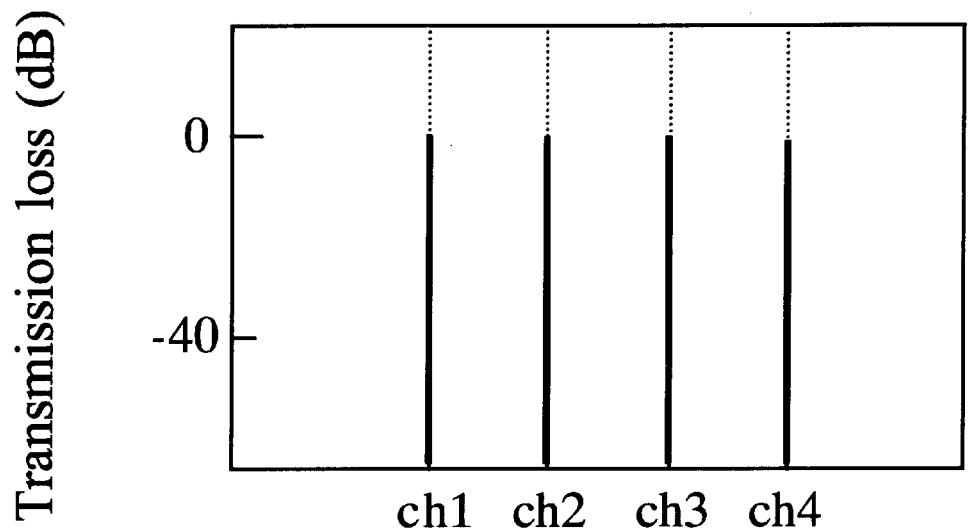

FIG.12
Characteristic of port Pth of OADM according to second embodiment
A.
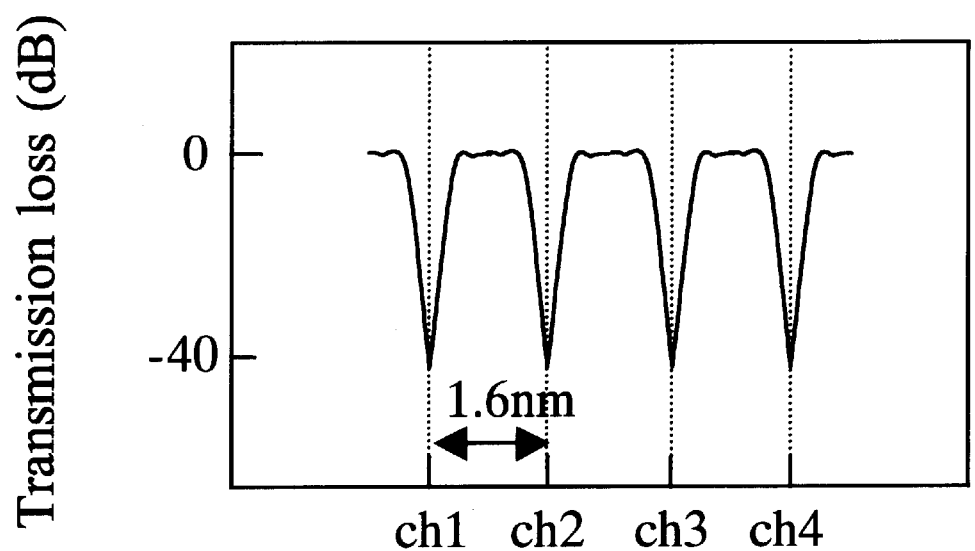
B.
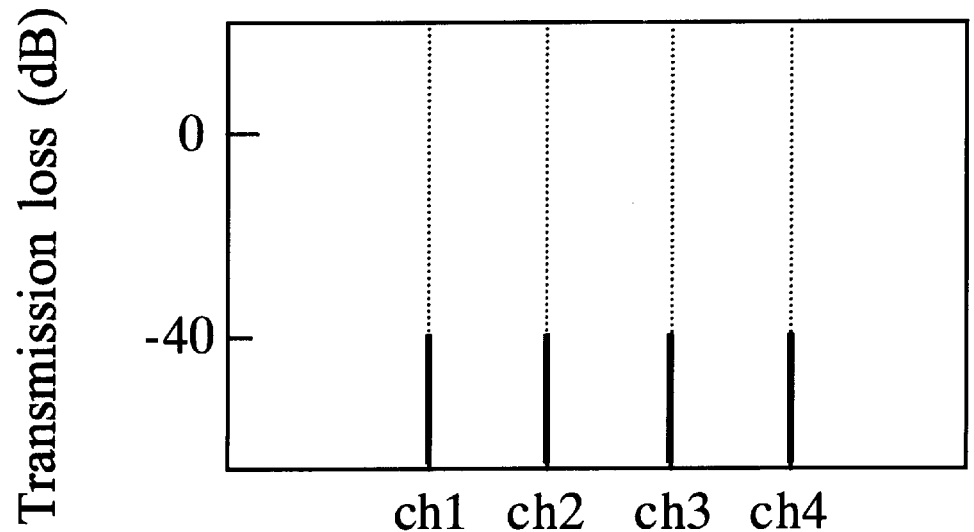

Relationship between frequency interval of channels and to-be-compensated amount in AOTF according to second embodiment $g(x) = 0.0714x^2 - 0.9021x + 3.5925$ Relationship between inverse of frequency interval of channels and to-be-compensated amount in AOTF in Gaussian curve Relationship between modulation signal for tracking and dropped optical signal

FIG.16

Relationship between selection pattern and compensation amount

| Pattern number | Selection pattern | | | | Compensation amount Δf (kHz) | | | |
|---|---|---|---|---|---|---|---|---|
| | ch1 | ch2 | ch3 | ch4 | Δf 1 | Δf 2 | Δf 3 | Δf 4 |
| 1 | 1 | 0 | 0 | 0 | 0 | * | * | * |
| 2 | 0 | 1 | 0 | 0 | * | 0 | * | * |
| 3 | 0 | 0 | 1 | 0 | * | * | 0 | * |
| 4 | 0 | 0 | 0 | 1 | * | * | * | 0 |
| 5 | 1 | 1 | 0 | 0 | − 3 | + 3 | * | * |
| 6 | 1 | 0 | 1 | 0 | − 1.5 | * | + 1.5 | * |
| 7 | 1 | 0 | 0 | 1 | − 0.5 | * | * | + 0.5 |
| 8 | 0 | 1 | 1 | 0 | * | − 3 | + 3 | * |
| 9 | 0 | 1 | 0 | 1 | * | − 1.5 | * | − 1.5 |
| 10 | 0 | 0 | 1 | 1 | * | * | − 1.5 | + 1.5 |
| 11 | 1 | 1 | 1 | 0 | − 4 | 0 | + 4 | * |
| 12 | 1 | 1 | 0 | 1 | − 3 | − 1 | * | + 1 |
| 13 | 1 | 0 | 1 | 1 | − 1 | * | − 1 | + 3 |
| 14 | 0 | 1 | 1 | 1 | | − 4 | 0 | + 4 |
| 15 | 1 | 1 | 1 | 1 | − 4.7 | − 1.4 | + 1.4 | + 4.7 |

RF frequency of ch 1 sgb1 = 174 MHz
RF frequency of ch 2 sgb2 = 174.2 MHz
RF frequency of ch 3 sgb3 = 174.4 MHz
RF frequency of ch 4 sgb4 = 174.6 MHz structure of another example of AOTF Structure of example of conventional AOTF Relationship between frequency of selected light and RF frequency in case of selecting one frequency in AOTF Explanatory views (port Pdr) of interaction effect in case of concurrently selecting plurality of frequencies in AOTF

FIG.21
Explanatory views (port Pdr) of interaction effect in case of concurrently selecting plurality of frequencies in AOTF
A.
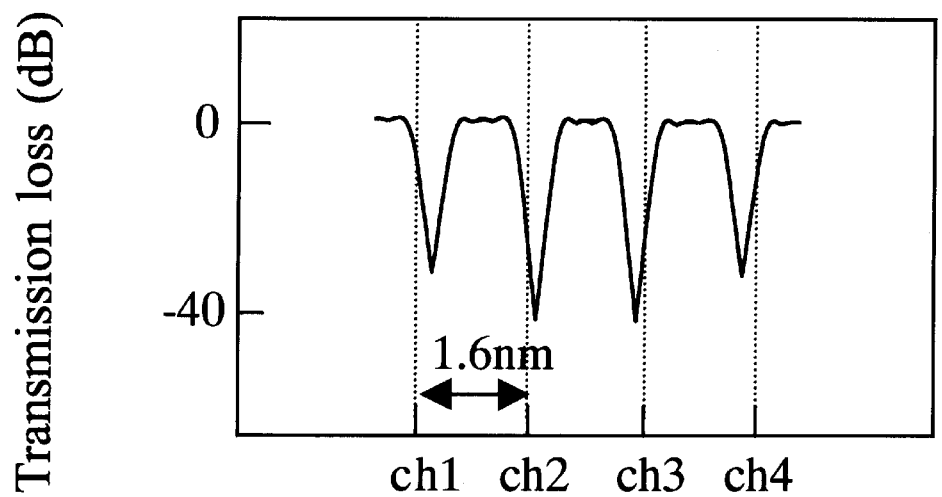
B.
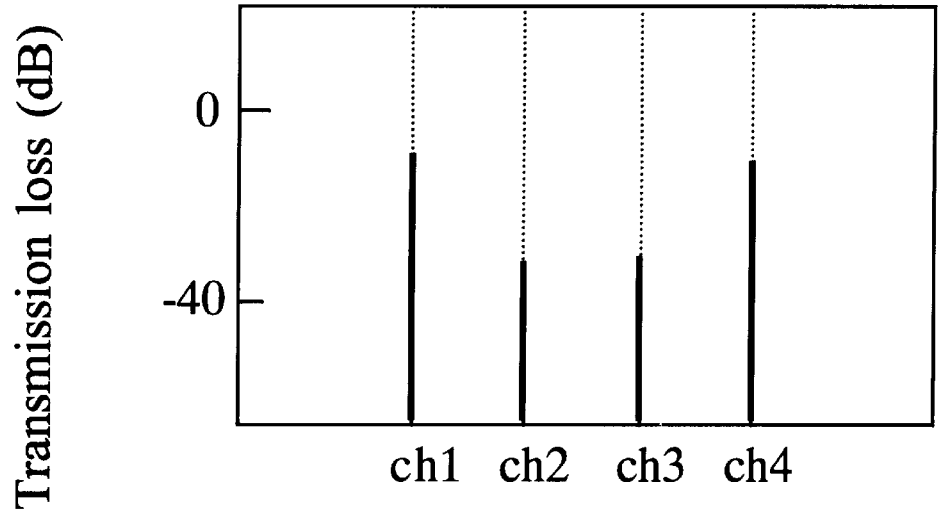

ACOUSTO-OPTICAL TUNABLE FILTER, METHOD OF DRIVING THE SAME, AND OPTICAL ADD/DROP MULTIPLEXER

BACKGROUND OF THE INVENTION

1. Field of the Invention

The present invention relates to an acousto-optical tunable filter which can appropriately filter/select/drop/add lights with a plurality of frequencies (wavelengths) and a method of driving the acousto-optical tunable filter. Further, the present invention relates to an optical add/drop multiplexer using the acousto-optical tunable filter.

In recent years multimedia communication, such as the Internet has been spreading quickly. In the field of communication technology, research and development of optical communication technology, which allows ultra-long distance communication and large-capacity communication, has been diligently undertaken in order to cope with the substantial increase in traffic volume from this high proliferation of multimedia communications. To cope with further increase in traffic volume, measures have been taken to increase the speed of transmission of wavelength-division multiplexing and to increase high-density multiplexing of the wavelength-division multiplexing (hereinafter abbreviated "WDM") transmission.

In particular, in recent years there has been a need for an optical communication system having an ADM (add-drop multiplexer) function, as well as an optical communication system for sending/receiving a WDM optical signal between two stations. In such an optical communication system having the ADM function, only an optical signal with a predetermined frequency from within the WDM optical signal, would be selectively transmitted through repeater stations, which are called node, and which are provided in an optical transmission line. An optical signal with a frequency other than the predetermined frequency would be dropped therefrom in the node, and another optical signal would be added thereto in the node to be transmitted to another node. Hence, considerable research has been made on the acousto-optical tunable filter (hereinafter abbreviated "AOTF") for realizing the ADM function.

2. Description of the Related Art

The AOTF is an optical component which induces a refractive index change in an optical waveguide by an acousto-optical effect, and rotates the polarization state of light propagating through the optical waveguide to separate/select an optical signal.

FIG. 18 is a schematic view showing the structure of an example of a conventional AOTF.

As shown in FIG. 18, a port Pin, a port Pad, a port Pth and a port Pdr are provided at input ends and output ends of optical waveguides 51, 52, respectively. The optical waveguides 51, 52 intersect with each other at two points, and polarization beam splitters (hereinafter abbreviated "PBS") 53, 55 are respectively provided at the intersections. The optical waveguides 51, 52 are formed on a substrate as a piezoelectric crystal in the AOTF and, for example, may be formed on a substrate of lithium niobate ($LiNbO_3$) by titanium (Ti) diffusion.

An interdigital transducer (hereinafter abbreviated "IDT") 54 is formed on the waveguides 51, 52 between the intersections where the polarization beam splitters are provided. The IDT 54 generates a surface acoustic wave by an RF signal supplied from oscillators 301-1 to 301-4 and changes the refractive indexes of the optical waveguides 51, 52. Two absorbers 56, 57 are provided for absorbing the surface acoustic wave, which is unnecessary for changing the refractive indexes of the optical waveguides 51, 52, and are formed to interpose the IDT 54. An interval between the absorbers 56, 57 is an action length.

A substrate part 16 of the AOTF is structured to include the optical waveguides 51, 52, the PBSs 53, 55, the IDT 54 and the absorbers 56, 57 on the substrate.

Input light 1, which is inputted into the port Pin, is light with a TE mode and a TM mode coexisting therein. The input light 1 is demultiplexed by the PBS 53 to TE mode light and TM mode light and the TM mode light propagates through the optical waveguide 51 and the TE mode light propagates through the optical waveguide 52. It should be mentioned that, when the surface acoustic wave is generated by applying an RF signal with a predetermined frequency, the refractive indexes of the optical waveguides 51, 52 change. For this reason, only light whose frequency interacts with this refractive index change, from among the input light 1, rotates its polarization state. The amount of the rotation is proportional to the action length in which the lights in the respective modes interact with the refractive index change and power of the RF signal.

Therefore, by optimizing the action length and the power of the RF signal, the TM mode light is converted to the TE mode light in the optical waveguide 51, and the TE mode light is converted to the TM mode light in the optical waveguide 52. As a result, the light, whose mode is converted, is outputted by the PBS 55 to the port Pdr as selected light, and the light, whose mode is not converted, is outputted to the port Pth as transmitted light.

Thus, the transmitted light, which is outputted from the port Pth, is the input light 1 inputted into the port Pin from which only the light with the frequency corresponding to the frequency of the RF signal is removed. Hence, it is possible to assume that the AOTF has a rejection function (band-eliminating function).

Meanwhile, input light 2, which is inputted into the port Pad, is also demultiplexed by the PBS 53 to the TE mode light and the TM mode light, and the TM mode light propagates through the optical waveguide 52 and the TE mode light propagates through the optical waveguide 51. When the surface acoustic wave is generated by applying the RF signal with the predetermined frequency, only light with a predetermined frequency rotates its polarization state, and the TE mode light is converted to the TM mode light in the optical waveguide 51 and the TM mode light is converted to the TE mode light in the optical waveguide 52. As a result, the light, whose mode is converted, is outputted by the PBS 55 to the port Pth on the transmitted light side of the ATOF, and the light, whose mode is not converted, is outputted to the port Pdr on the selected light side of the AOTF.

The selected light, which is outputted from the port Pdr, is the input light 1 inputted into the port Pin from which only the light with the frequency corresponding to the frequency of the RF signal is selected. Further, the transmitted lights which is outputted from the port Pth, is the input light 1 inputted into the port Pin from which only the light with the frequency corresponding to the frequency of the RF signal is removed, and only the light with the frequency corresponding to the frequency of the RF signal, out of the input light 2, which is inputted into the port Pad, is added to the removed frequency. Hence, it is possible to assume that the AOTF has an optical add/drop function.

Furthermore, by changing the frequency of the RF signal, the AOTF can change the frequency of light to be selected/ added/transmitted, and hence it also functions as a variable wavelength selective filter.

FIG. 19 is a view showing a relationship between a frequency of selected light and an RF frequency for the case of selecting one frequency in the AOTF. The horizontal axis of FIG. 19 indicates the frequency of the selected light displayed in THz, and the vertical axis thereof indicates the RF frequency of an RF signal displayed in MHz. As shown in FIG. 19, the frequency of the selected light is proportional to the frequency of the RF signal. FIG. 19 clearly shows, for example, to select light with a frequency of 193.4 THz, it is suitable to supply an RF signal with a frequency of 174.4 MHz to the IDT 54. To select light with a frequency of 194.2 THz, it is suitable to supply the RF signal with a frequency of 175.2 MHz to the IDT 54.

Meanwhile, to select lights with a plurality of frequencies (wavelengths) in the AOTF, a plurality of RF signals, whose frequencies are different from each other, are supplied to the IDT 54 of the AOTF.

For example, as shown in FIG. 18, the oscillators 301-1 to 301-4 are structured to generate four RF signals, whose frequencies are different from each other; four switches (hereinafter abbreviated "SW") 127-1 to 127-4 are Provided for selecting the RF signal to be supplied; and a multiplexer 128 is provided for multiplexing the RF signals between oscillators 301-1 to 301-4 and the IDT 54, so that the lights with the four frequencies can be optionally selected. Further, an SW control circuit 126 is provided for turning on/off the SWs 127-1 to 127-4 and a central processing unit 302 is provided for supplying a control signal to the SW control circuit 126 to designate which SWs 127-1 to 127-4 should be turned on/off.

FIGS. 20A–20C are explanatory views (port Pdr) of an interaction effect for the case of selecting a plurality of frequencies at the same time in the AOTF, and the output characteristic in each drawing is the characteristic of light to be selected/dropped.

FIG. 20A is a view showing a spectrum of the port Pdr when an RF signal with a frequency sgb3, which is for selecting a frequency of light of a channel 3, is supplied to the IDT 54 of the AOTF, in order to select only the channel (hereinafter abbreviated "ch") 3. In FIG. 19, ch 3 is allocated to the frequency of 192.4 THz, therefore the reference frequency sgb3, which is supplied to the IDT 54, is the frequency of 173.4 MHz.

FIG. 20B is a view showing a spectrum of the port Pdr when the four RF signals are supplied to the IDT 54 of the AOTF, in order to select a ch 1 to ch 4 at the same time, and FIG. 20C is a view showing transmission loss (corresponding to optical power of the selected light) of respective frequencies corresponding to the ch 1 to ch 4.

In this case, frequencies of the four RF signals are at the frequency sgb1 of the RF signal to select only ch 1, the frequency sgb2 of the RF signal to select only ch 2, the frequency sgb3 of the RF signal to select only ch 3, and the frequency sgb4 of the RF signal to select only ch 4. Thus, the frequencies sgb of the RF signals, which separately select the light, are supplied even when selecting the plurality of the lights. In FIG. 19, sgb1 is at the frequency of 173.0 MHz, sgb2 is at the frequency of 173.2 MHz, and sgb4 is at the frequency of 173.6 MHz.

Thus, a comparison of FIG. 20A, FIG. 20B and FIG. 20C clearly shows that when the frequencies of the RF signal for selection of the light with one frequency are simply collected and supplied to the IDT 54 in order to select the lights with a plurality of frequencies in the AOTF, the selected lights reach their peaks at the frequencies which are deviated from the respective frequencies corresponding to the ch 1 to ch 4.

When the frequencies for selecting the light with one frequency are simply collected in order to select the lights with the plurality of the frequencies in the AOTF to generate acoustic waves, a phenomenon of the decreasing frequency interval like the above (interaction effect) is disclosed in, for example, "Multichannel Operation of AOTF Switches: Reducing Channel-to-Channel Interaction" Oanet L. Jackel et al., IEEE photonics technology letters. Vol. 7, No. 4, Apr. 1995), "Acousto-Optic Tunable Filter (AOTF's) for Multi-wavelength Optical Cross-Connects: Crosstalk Considerations" Oanet L. Jackel et al.), and "Time-Dependent Analysis of Acousto-Optic Tunable Filters for Multichannel Optical Switching" (G. Hugh Song, Journal of lightwave technology, Vol. 15, No. 3, Mar. 1997).

Incidentally, FIGS. 21A and 21B are explanatory views (port Pth) of the interaction effect for the case of selecting a plurality of frequencies at the same time in the AOTF. FIGS. 21A and 21B show a characteristic of transmitted light and therefore these correspond with FIGS. 20A–20C showing the characteristic of the selected light. FIG. 21A is in the inverse relation with FIG. 20B and FIG. 21B is in the inverse relation with FIG. 20C. The horizontal axes of the respective drawings of FIGS. 20A–20C and FIGS. 21A–21B show a wavelength (channel) and the vertical axes thereof show transmission loss displayed in dB.

It should be noted that deviations are caused by/due to the interaction effect between the frequency of the RF signal for the case of selecting the lights with the plurality of the frequencies (wavelengths) in the AOTF and the frequency of the RF signal for the case of separately selecting the light with one frequency.

Therefore, when the RF signals with the frequencies for separately selecting the light with one frequency are simply collected in order to select the lights with the plurality of the frequencies in the AOTF at the same time for generating acoustic waves, there is a disadvantage that it is difficult to select the lights with target frequencies.

Supposing that, for example, the frequency of the RF signal to select only the light with the frequency f1 is a reference frequency sgbf1, and the frequency of the RF signal to select only the light with the frequency f2 is a reference frequency sgbf2. The problem is that, in selecting the lights with the frequency f1 and the frequency f2, it is impossible to appropriately select the lights with the frequencies f1, f2 when the RF signal with the reference frequency sgbf1 and the RF signal with the reference frequency sgbf2 are supplied to the AOTF.

For this reason, there is a problem that the optical power of the selected light and the transmitted light are not sufficiently secured to select the lights with the plurality of the frequencies in the AOTF.

SUMMARY OF THE INVENTION

It is an object of the present invention to provide an AOTF which can appropriately select a plurality of lights with target frequencies and a method of driving the AOTF.

It is another object of the present invention to provide an optical add/drop multiplexer (hereinafter abbreviated "OADM") using the AOTF.

The above objects can be achieved by an acousto-optical tunable filter for selectively outputting light with a frequency corresponding to an RF frequency of an RF signal, comprising: a signal source for supplying an RF signal including at least one RF frequency to the acousto-optical tunable filter; a compensating section for determining an RF frequency for selecting one light from a plurality of lights with different frequencies from each other in such a manner that an RF frequency (reference frequency) for selecting only one light from the plurality of lights is determined by adding/subtracting a predetermined compensation amount to/from the RF frequency for selecting only one light, when selecting the plurality of lights in the acousto-optical tunable filter; and a controlling section for controlling the signal source to oscillate the plurality of RF frequencies determined by the compensating section.

In selecting the plurality of lights with different frequencies from each other, the AOTF can allow the signal source to appropriately generate the RF signal including the plurality of RF frequencies for selecting the respective lights, with consideration given to the predetermined compensation amount for compensating a deviation amount due to the interaction effect. Thus, the AOTF can appropriately select the plurality of lights with target frequencies. Thus, even in selecting the plurality of lights in the AOTF, it is possible to obtain optical power of selected light which is almost equal to that for selecting one light. Moreover, it is possible to obtain a predetermined filtering level of transmitted light.

Even for the case of dropping a plurality of optical signals from a WDM optical signal in the OADM using the above AOTF, it is possible to obtain optical power of a dropped optical signal which is almost equal to that of dropping one optical signal therefrom.

According to the acousto-optical tunable filter and the method of driving the acousto-optical tunable filter of the present invention, the reference frequency is compensated by a deviation amount due to the interaction effect so that the plurality of lights can be properly selected with the target frequencies. Therefore, the optical power of light, which is selectively outputted from the AOTF, is the same for both of the case of selecting the light, separately and the case of selecting the plurality of lights concurrently, and the optical signal-to-noise ratio is also the same for both cases when light is an optical signal.

Moreover, in the optical add/drop multiplexer according to the present invention, the above acousto-optical tunable filter is used so that the optical power of the optical signal to be dropped/added and also the optical signal-to-noise ratio are the same in both the case that one optical signal is dropped from/added to the WDM optical signal and the case that a plurality of optical signals is dropped therefrom/added thereto.

BRIEF DESCRIPTION OF THE DRAWINGS

FIGS. 6A–6C are diagrams showing explanatory views of a method to determine a predetermined compensation amount by superposition;

FIGS. 10A and 10B are diagrams showing a comparison between a measurement result of a predetermined compensation amount and a calculation result of a formula 2 and a formula 3;

FIGS. 11A and 11B are diagrams showing a characteristic of a port Pdr of the OADM according to the second embodiment;

FIGS. 12A and 12B are diagrams showing a characteristic of a port Pth of the OADM according to the second embodiment;

FIG. 16 is a table showing a relationship between a selection pattern and a compensation amount;

FIGS. 21A and 21B are diagrams showing explanatory views (port Pth) of the interaction effect for the selection of a plurality of frequencies in the AOTF at the same time.

DESCRIPTION OF THE PREFERRED EMBODIMENTS

Hereinafter, the preferred embodiments of the present invention will be explained with reference to the drawings. Incidentally, the same numerals and symbols are given to the same structure in the respective drawings, and detailed explanations thereof are omitted.

Figure 1:
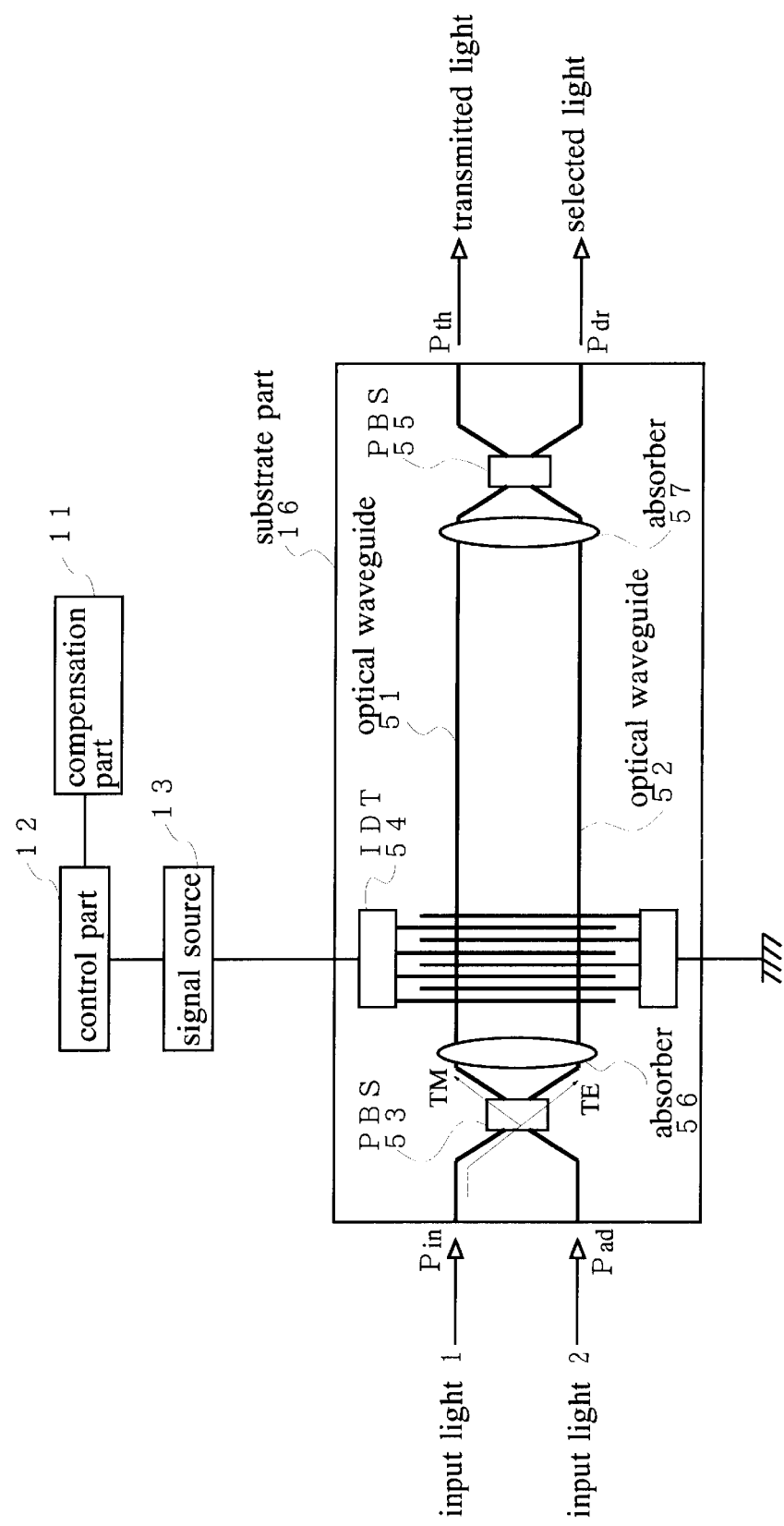
FIG. 1 is a schematic view showing the structure of an AOTF according to a first embodiment.

As shown in FIG. 1, the AOTF includes a compensation part 11, a control part 12, a signal source 13 and a substrate part 16. The substrate part 16 is an optical part of the AOTF for selectively outputting light, whose frequency corresponds to an RF frequency of an RF signal. More specifically, the substrate part 16 includes optical waveguides 51, 52, PBSs 53, 55, an IDT 54 and absorbers 56, 57, and the structure of the substrate part 16 is the same as that explained with reference to FIG. 18. Therefore, its explanation will be omitted. The signal source 13 supplies the RF signal including at least one RF frequency to the IDT 54 in the substrate part 16 of the AOTF.

For the case of selecting a plurality of lights with different frequencies from each other in the substrate part 16 of the AOTF, the compensation part 11 first determines an RF frequency for selecting one light out of the plurality of lights by adding/subtracting a predetermined compensation amount to/from an RF frequency for selecting only one light. By repeating this operation, the compensation part 11 determines all of the plurality of RF frequencies for selecting the plurality of lights. The control part 12 controls the signal source 13, which oscillates the plurality of the RF frequencies. The plurality of the RF frequencies are determined by the compensation part 11.

The horizontal axes of the respective drawings of FIGS. 2A–2D show a frequency (wavelength) of light which is selected by the AOTF, and vertical axes thereof show an RF frequency of an RF signal.

Figure 2:
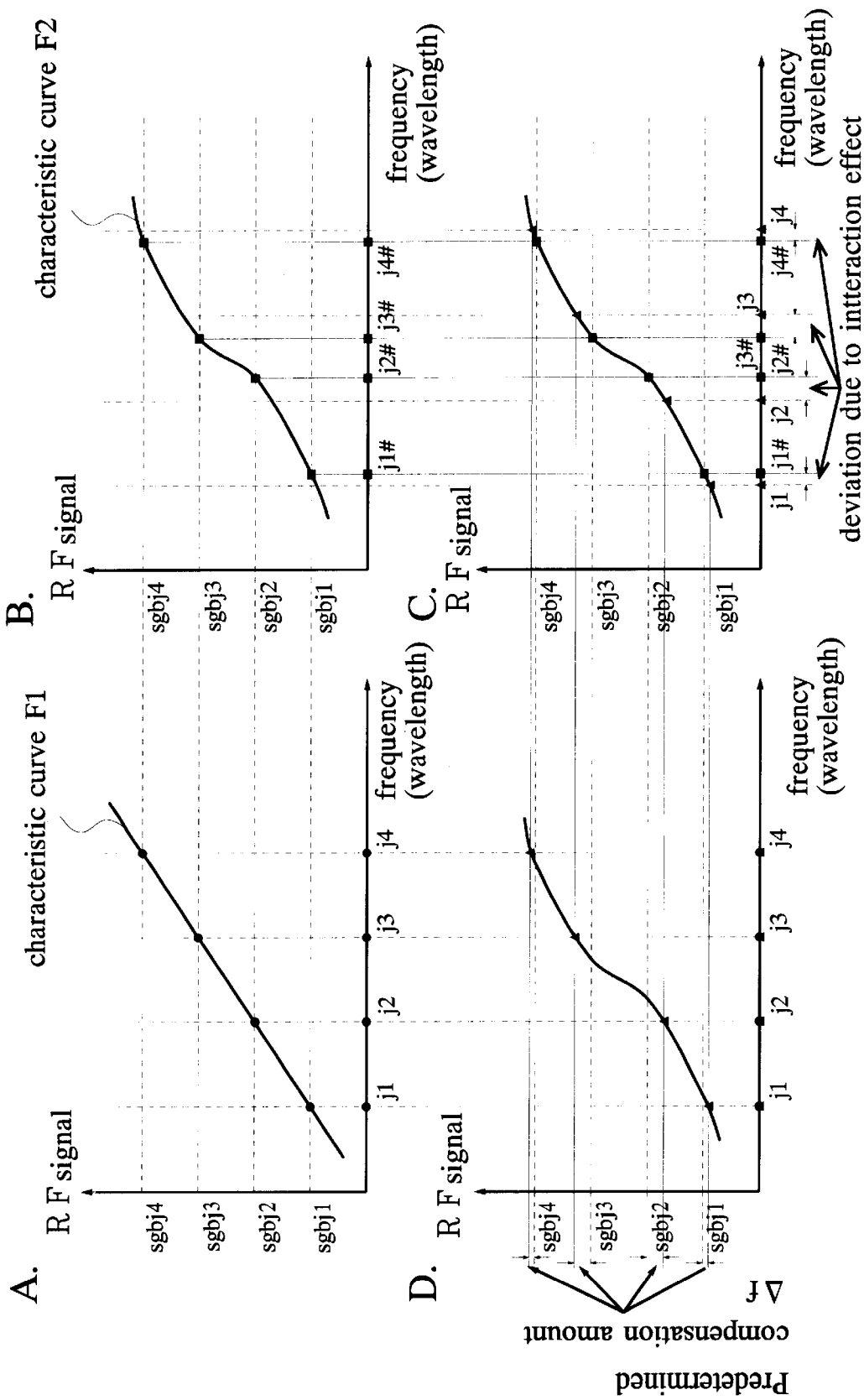
FIGS. 2A–2D are diagrams explaining a compensation amount.

FIG. 2A shows a relationship between the frequency of the light and the RF frequency of the RF signal (reference frequency) when one light is separately selected in the AOTF. Each of FIG. 2B to FIG. 2D shows a relationship between the frequency of the light and the RF frequency of the RF signal when four lights are selected at the same time in the AOTF. Incidentally, FIGS. 2A to 2D are the views showing a concept of the compensation amount and characteristic curves in the respective diagrams are not from actual measurement or calculation results.

The reference frequency sgbj is an RF frequency of an RF signal for selecting light with a frequency j when only one light is selected in the AOTF.

The case of selecting four lights with frequencies j1, j2, j3, j4 in the AOTF will be described below.

First, as shown in FIG. 2A, when the four lights are selected separately, the relationship between the frequency of the light to be selected and the frequency of the RF signal is expressed as a characteristic curve F1 which is substantially linear. In order to select the light with the frequency j1 as shown with •, for example, it is suitable to supply a reference frequency sgbj1 to the IDT 54 of the AOTF.

Meanwhile, when an RF signal including the four RF frequencies is supplied to the IDT 54 of the AOTF in order to select the four lights, the relationship shown by the characteristic curve F1 is not maintained, and the relationship between the frequency of the light to be selected and the frequency of the RF signal is expressed as a characteristic curve F2 which is different from the characteristic curve F1.

Therefore, as shown in FIG. 2D, a predetermined compensation amount $-\Delta fj1$, j1j2j3j4 is added to the reference frequency sgbj1, a predetermined compensation amount $-\Delta fj2$, j1j2j3j4 is added to the reference frequency sgbj2, a predetermined compensation amount $+\Delta fj3$, j1j2j3j4 is added to the reference frequency sgbj3, and a predetermined compensation amount $+\Delta fj4$, j1j2j3j4 is added to the reference frequency sgbj4, so that ▲ and ■ correspond to each other and deviation amounts due to the interaction effect are compensated. Further $\Delta fjh$, j1j2 ... jk is a predetermined compensation amount which is necessary for the RF frequency sgjh when selecting light with a frequency of jh ($h \leq k$, wherein k and h are positive integers and k is the number of lights with frequencies j1, j2 ... jk) and the lights are selected at the same time.

As a result, as shown with ▼ and ■ in FIG. 2C, when the RF signal including the reference frequencies used for selecting the light separately, is supplied to the IDT 54 of the AOTF in order to select the four lights, the lights with target frequencies are not selected and deviations occur due to the interaction effect.

Therefore, as shown in FIG. 2D, a predetermined compensation amount $-\Delta fj1$, j1j2j3j4 is added to the reference frequency sgbj1, a predetermined compensation amount $-\Delta fj2$, j1j2j3j4 is added to the reference frequency sgbj2, a predetermined compensation amount $+\Delta fj3$, j1j2j3j4 is added to the reference frequency sgbj3, and a predetermined compensation amount $+\Delta fj4$, j1j2j3j4 is added to the reference frequency sgbj4, so that ▼ and ■ correspond to each other and deviation amounts due to the interaction effect are compensated. Further $\Delta fjh$, j1j2 ... jk is a predetermined compensation amount which is necessary for the RF frequency sgjh when selecting light with a frequency of jh ($h \leq k$, wherein k and h are positive integers and k is the number of lights with frequencies j1, j2 ... jk) and the lights are selected at the same time.

Thus, in order to select the plurality of the lights in the AOTF, it is suitable to add/subtract the predetermined compensation amount $\Delta f$ to/from the reference frequency sgb of the RF signal which is used for selecting the light separately. A sign of the compensation amount $\Delta f$, whether added to or subtracted from, is decided according to the interaction effect being attracted toward the center of the frequencies of the lights which are selected at the same time. The center of the frequencies of the lights can be determined by an arithmetical mean of the frequencies of the lights which are selected at the same time. Taking the above as an example, it will be $(j1+j2+j3+j4)/4$.

Figure 19:
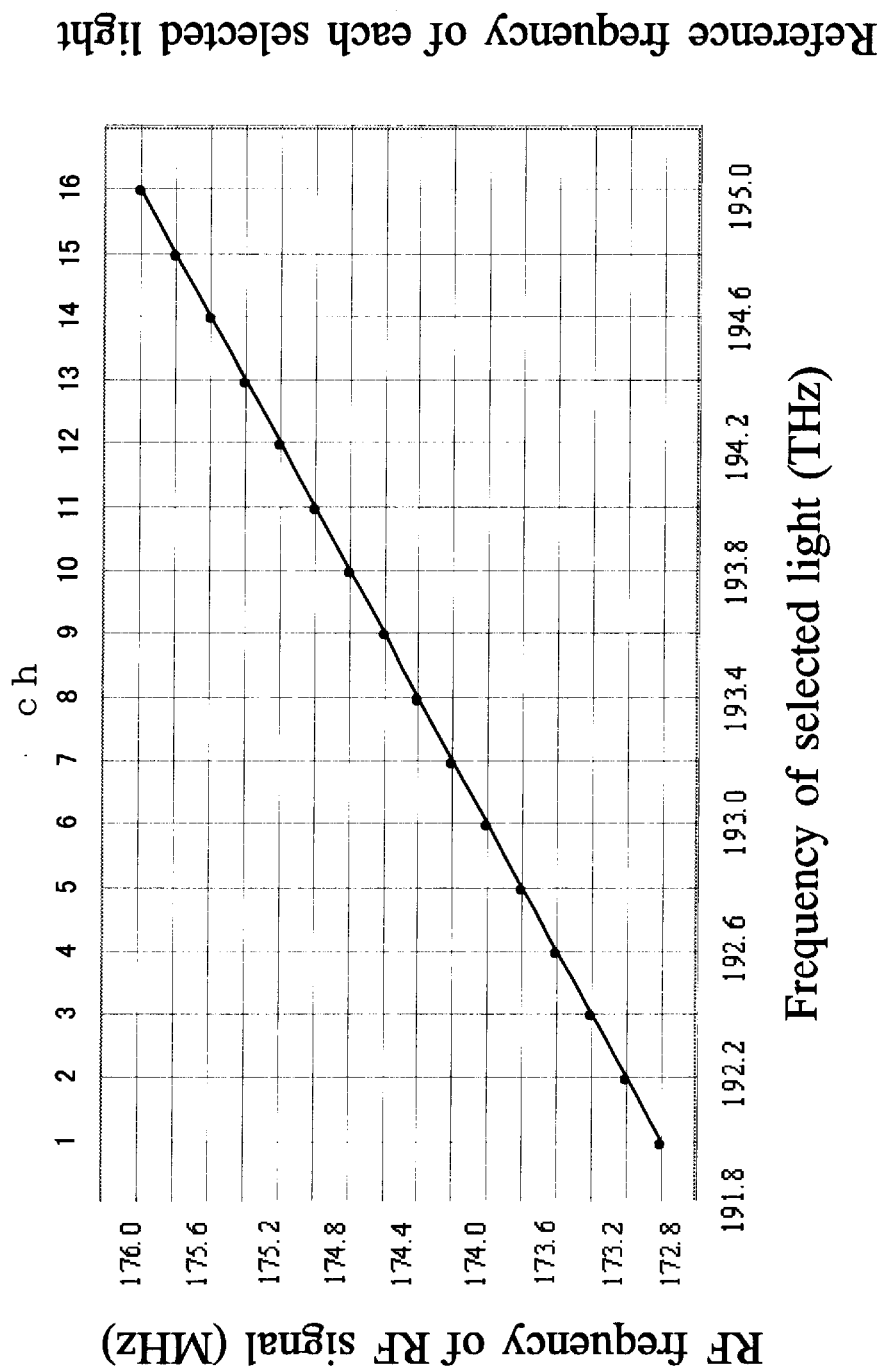
FIG. 19 is a diagram showing a relationship between a frequency of selected light and an RF frequency in the case of selecting one frequency in the AOTF.

Next, some of the representative examples will be described from actual simulation results of the compensation amount $\Delta f$. It should be mentioned that light, which is inputted into a port Pin of the AOTF, is a 16-wave WDM optical signal. Assuming that the WDM optical signal is rejected or added, an optical signal is added thereto/dropped therefrom in the AOTF. The number of chs is 16, and the respective chs are disposed with wavelength intervals of 1.6 nm. Similarly to FIG. 19, ch 1 is disposed at a frequency of 192 THz, ch 2 is disposed at a frequency of 192.2 THz, ..., and ch 16 is disposed at a frequency of 195 THz. Incidentally, it is verified that the simulation result is in good agreement with an actual measurement result in the AOTF.

Figure 3:
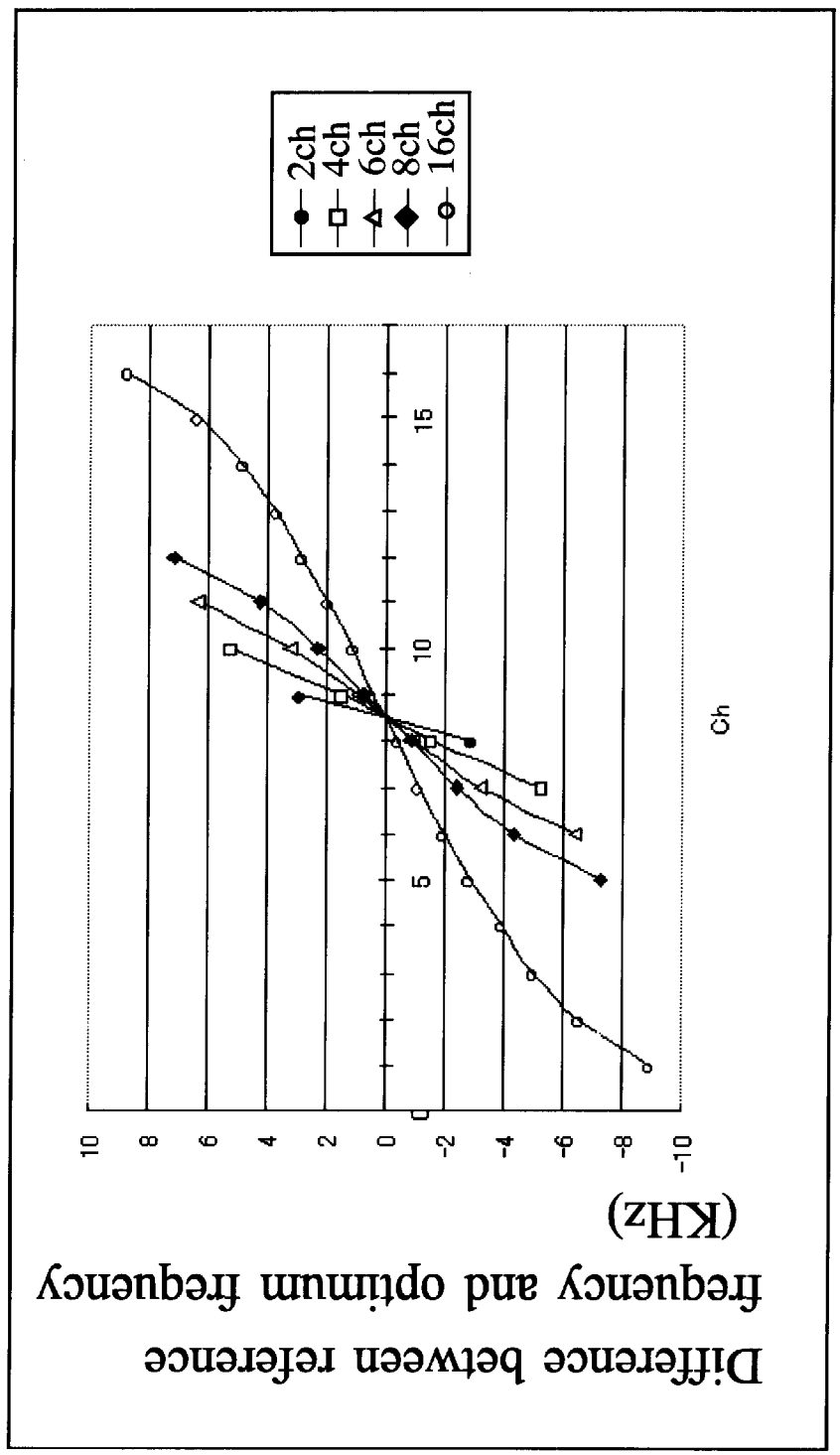
FIG. 3 is a diagram showing a first simulation result of a predetermined compensation amount.
Figure 4:
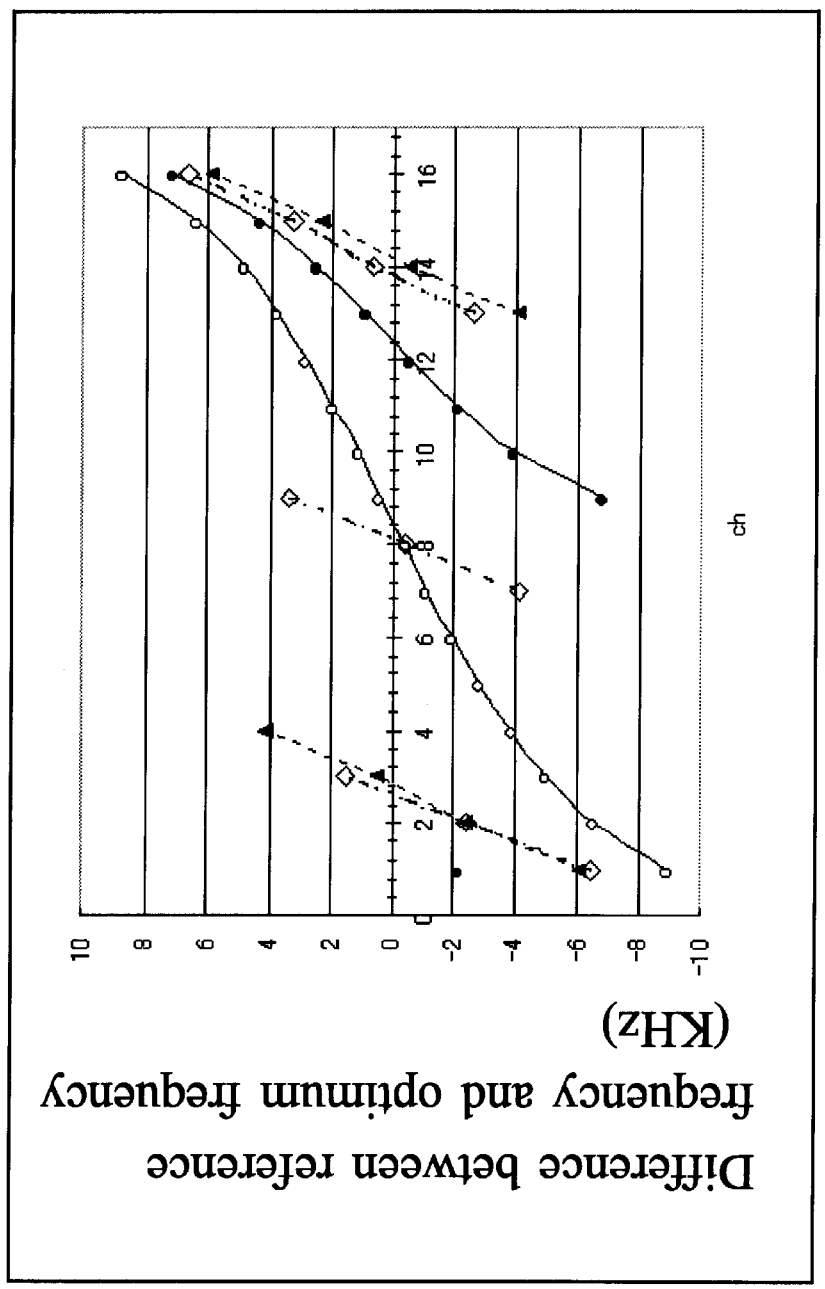
FIG. 4 is a diagram showing a second simulation result of a predetermined compensation amount.
Figure 5:
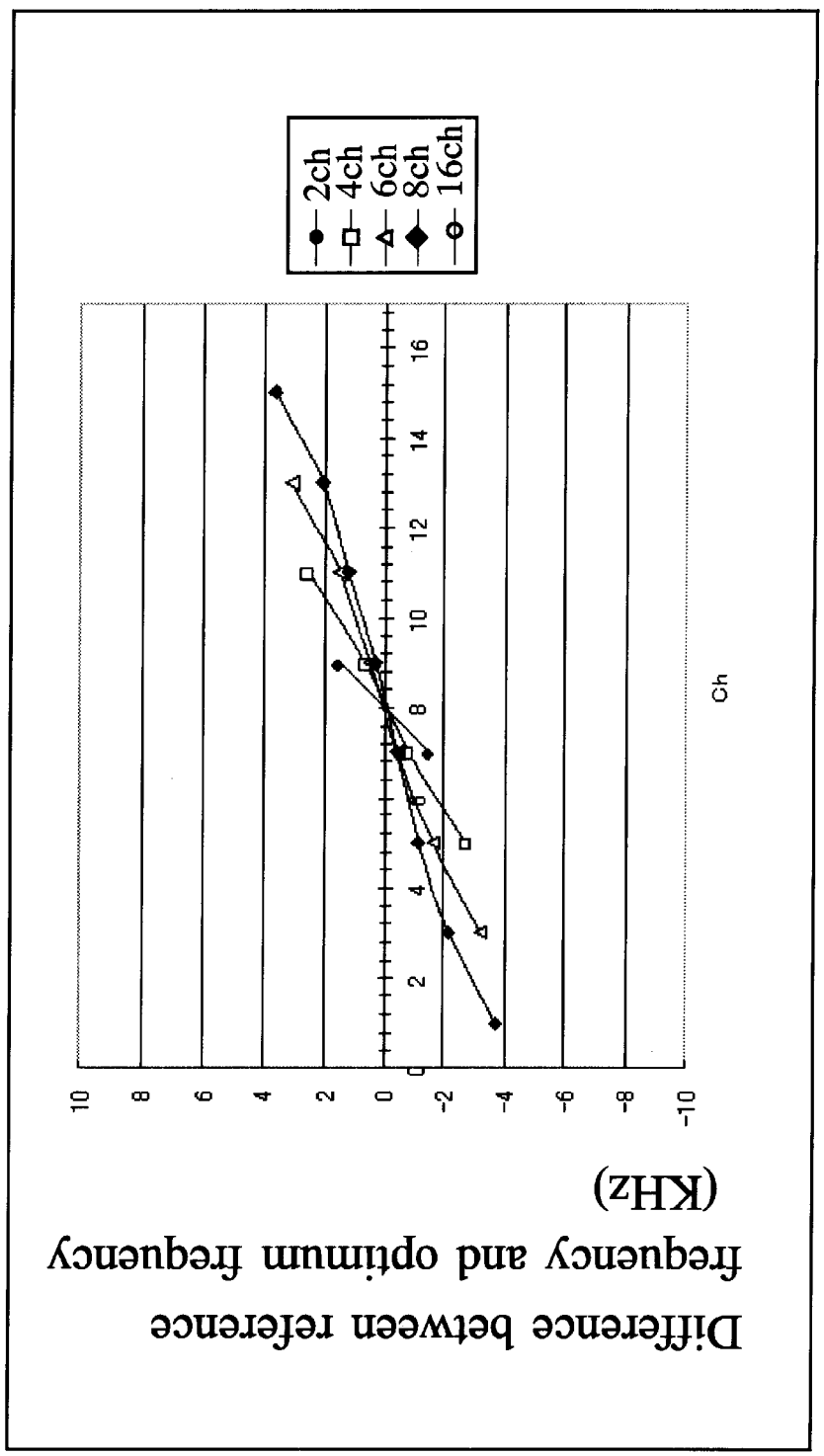
FIG. 5 is a diagram showing a third simulation result of a predetermined compensation amount.

The horizontal axes of FIG. 3 to FIG. 5 show the channel numbers, and vertical axes thereof show a compensation amount (frequency difference) displayed in kHz. The frequency difference is, assuming the frequency sgbj of the RF signal, which is used for selecting a ch j separately as a reference, a difference between the reference and an RF frequency of an RF signal, which can optimally select the ch j, when a plurality of chs are selected at the same time.

In FIG. 3, a plurality of chs are selected successively and the number of the chs to be selected is increased from the center of the ch number, ch 8 and ch 9, toward both sides thereof. Selecting two is represented by •, selecting four is represented by ☐, selecting six is represented by △, selecting eight is represented by ♦, and selecting sixteen is represented by o.

In FIG. 4, chs of an arbitrary number and of an arbitrary ch number are selected, and selecting the ch 1 to ch 3, the ch 7 to ch 9 and the ch 13 to ch 16 is represented by ◇, selecting the ch 1 to ch 4, and the ch 13 to ch 16 is represented by ▲, selecting the ch 1 and ch 9 to ch 16 is represented by •, and selecting the ch 1 to ch 16 is represented by o.

In FIG. 5, a plurality of chs are selected successively while skipping the ch at an interval of one, and the number of the chs to be selected is increased from the center of the ch number, ch 7 and ch 9, toward both sides thereof. The selection of two is represented by •, the selection of four ch is represented by □, the selection of six ch is represented by Δ, and the selection of eight ch is represented by ♦. Since every other ch is selected in FIG. 5, it can be regarded as a simulation result of an 8-wave WDM optical signal whose ch number is 8 having wavelength intervals of 3.2 nm.

Figure 20:
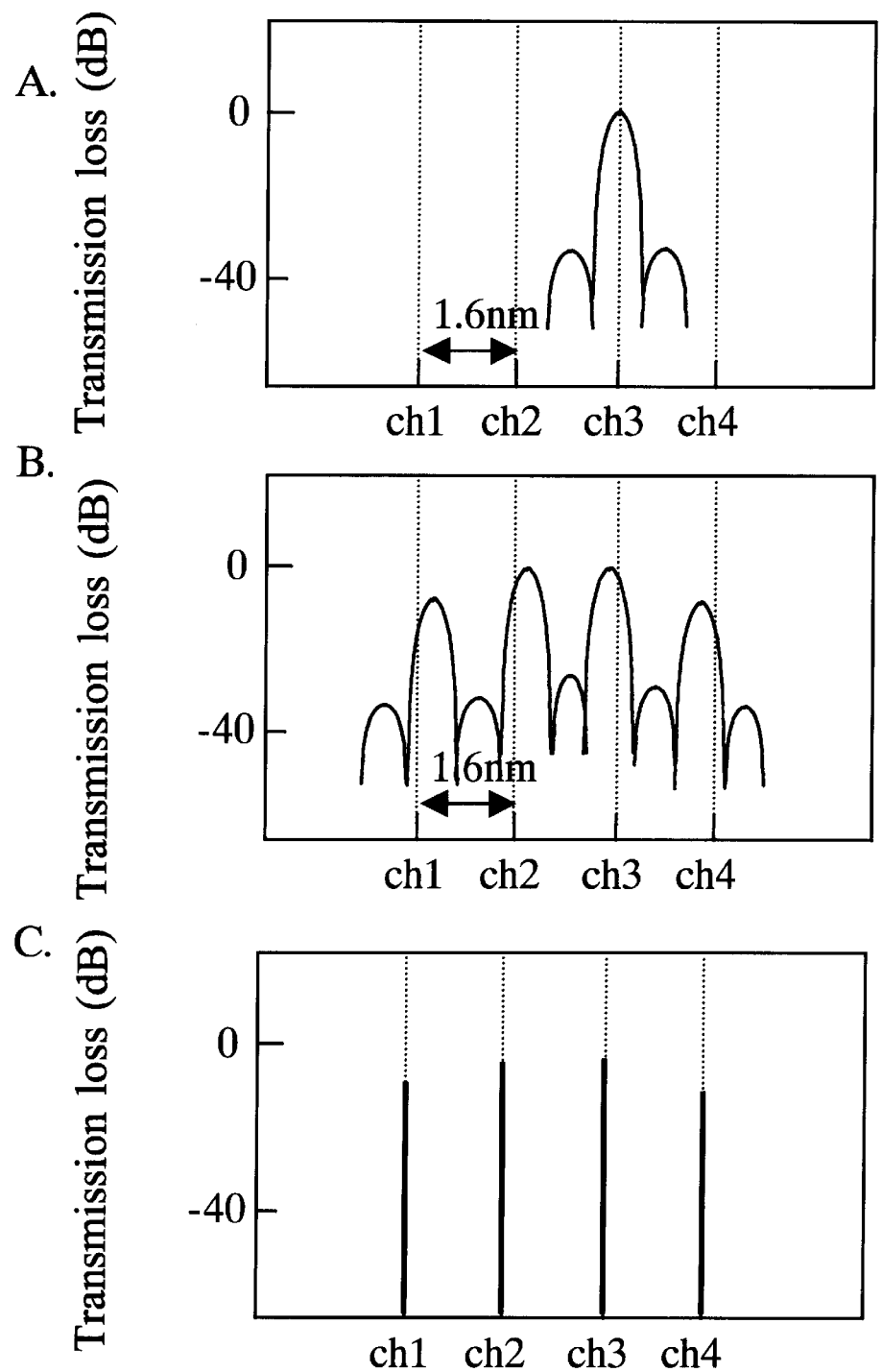
FIGS. 20A and 20C are diagrams showing explanatory views (port Pdr) of an interaction effect for the selection of a plurality of frequencies in the AOTF at the same time, and output characteristics in the drawings are a characteristic of light to be selected/dropped.

In FIG. 3 to FIG. 5, the action length of the AOTF is about 70 mm, and a surface acoustic wave is given power distribution to obtain a cosine curve (in a range from −90° to +90°) from a start point of the action (0 mm) to an end point of the action (about 70 mm) in order to suppress a side lobe of spectrums shown in FIG. 20A and FIG. 20B.

For the case of selecting the plurality of the lights with different frequencies from each other in the AOTF, the compensation part 11 determines an RF frequency sg for selecting one light out of the plurality of lights by adding/subtracting the predetermined compensation amount Δf to/from the RF frequency sgb for selecting only one light, as a first step. By repeating this operation for the plurality of the lights, the compensation part 11 determines all of the plurality of the RF frequencies sg for selecting the plurality of the lights, as a second step. Then, the control part 12 receives data concerning a then-determined plurality of the RF frequencies sg from the compensation part 11, and allows the signal source 13 to generate the RF signal including the determined plurality of the RF frequencies sg, as a third step. As a fourth step, the signal source 13 supplies the generated RF signal to the IDT 54 of the AOTF. The AOTF is driven in this way when selectively outputting the plurality of the lights with desired frequencies.

The predetermined compensation amount is added to/subtracted from the reference frequency for selecting the light separately, and thereafter, the RF signal is supplied to the IDT 54 of the AOTF, whereby the light with the same frequency can be selected by the AOTF in both the case of selecting the light separately and the case of selecting the plurality of the lights at the same time. Since the light with the target frequency is selected with the optimum RF frequency, optical power of the light which is selectively outputted from the AOTF is the same for both the above-mentioned case of selecting the light separately and the above-mentioned case of selecting the plurality of the lights at the same time and optical signal-to-noise ratio is also the same for both above-mentioned cases of selecting the light separately and selecting the plurality of the lights at the same time as long as the light is the optical signal.

The simulations shown in FIG. 3 to FIG. 5 may be performed as necessary to make the combination of the plurality of the lights in accordance with the number and frequency (selection pattern) so that the predetermined compensation amount may be determined from a table showing a relationship between the combination and the RF frequency for selecting the light of the combination. Alternately, the predetermined compensation amount Δf may be determined based on a frequency interval (wavelength interval) between the RF frequencies sgb, each of which is used for selecting only one light.

Moreover, as to the predetermined compensation amount, the frequency interval between the RF frequencies sgb, each of which is used for selecting only one light, may be expressed as a polynomial of second order or more, by a multiple regression analysis or the like from the analytical results of FIG. 3 to FIG. 5.

FIGS. 2A–2D show the case for selection of the four lights at the same time and this case is explained below, however, the case for selection of an arbitrary number of lights can be explained similarly. For the latter case, a characteristic curve showing the relationship between the frequency of the light to be selected and the frequency of the RF signal varies according to the frequency interval of the lights to be selected, the number of the lights to be selected and the like.

It is suitable to determine the characteristic curve (FIG. 2B as described above) showing the relationship between the frequency of the light to be selected and the frequency of the RF signal, for each frequency interval of the lights to be selected, number of the lights to be selected and the like, to determine the predetermined compensation amount Δf. However, it is also suitable to divide the case of selecting the plurality of the lights at the same time into the cases of selecting two lights at the same time, determine the compensation amounts respectively and calculate the sum of the then-determined compensation amounts, thereby determining the predetermined compensation amount Δf in the case of selecting the plurality of the lights at the same time. This means that the amount of deviation occurring in one light to be selected due to the interaction effect is influenced by each of the other lights, which is superpositioned.

For example, for the case of selecting the four lights with the frequencies of j1, j2, j3, j4, the compensation amount Δfj2, j1j2j3j4 of the reference frequency sgbj2 for selection of light with a frequency j2 is described concretely with reference to FIGS. 6A–6C as follows.

The horizontal axes of the respective drawings of FIGS. 6A–6C show a frequency of light, which is selected by the AOTF (wavelength, ch), and the vertical axes thereof show an RF frequency of an RF signal. FIG. 6A shows the selection of the lights with the frequency j1 and the frequency j2 in the AOTF, FIG. 6B shows the selection of the lights with the frequency j2 and the frequency j3 in the AOTF, and FIG. 6C shows the selection of the lights with the frequency j2 and the frequency j4 in the AOTF. Incidentally, FIGS. 6A–6C are diagrams, which show the a concept of the superposition method, and the characteristic curves in the respective drawings are not from actual measurement or calculation results.

For the case of selecting four lights with frequencies of j1, j2, j3, j4, when the light with the frequency j2 is selected, there may be four cases of selecting the lights with the frequency j1 and the frequency j2, selecting the lights with the frequency j2 and the frequency j3 and selecting the lights with the frequency j2 and the frequency j4.

A compensation amount Δfh, hk which is necessary for an RF frequency sgh for selecting light with a frequency h, in the case of selecting two lights with frequencies h, k, is regarded, in particular, as a to-be-compensated amount (hereinafter to be referred to as compensation amount between two frequencies) g(h, k). Namely, g(h, k)=Δfh, hk.

When the lights with the frequency j1 and the frequency j2 are selected, a characteristic curve F3A shown in FIG. 6A is obtained, and a compensation amount between the two frequencies, which is necessary for the RF frequency sgj2, for selecting the light with the frequency j2 is g(j2, j1).

When the lights with the frequency j2 and the frequency j3 are selected, a characteristic curve F3B shown in FIG. 6B is obtained, and a compensation amount between the two frequencies, which is necessary for the RF frequency sgj2, for selecting the light with the frequency j2 is g(j2, j3).

When the lights with the frequency j2 and the frequency j4 are selected, a characteristic curve F3C shown in FIG. 6C is obtained, and a compensation amount between the two frequencies, which is necessary for the RF frequency sgj2, for selecting the light with the frequency j2 is g(j2, j4).

In order to produce the superposition, the predetermined compensation amount Δfj2, j1j2j3j4 can be expressed as follows:

Δfj2, j1j2j3j4=g(j2, j1)+g(j2, j3)+g(j2, j4)

In general, the predetermined compensation amounts Δfjh, j1j2 . . . jk can be expressed as follows:

$$\Delta fjh, j1j2 \cdots jk = \sum_{s=1}^{k(k \neq h)} g(jh, js) \quad \text{(Formula 1)}$$

In order to bring the calculation into line with the characteristic and the like of th AOTF as an actual product, it may be suitable to use a correction coefficient R (0<R) to produce the following formula:

$$\Delta fjh, j1j2 \cdots jk = \sum_{s=1}^{k(k \neq h)} g(jh, js) \quad \text{(Formula 2)}$$

When a difference between the RF frequency for selecting one light out of two lights for the case of the selection of two lights in the AOTF and the RF frequency (reference frequency) for the selection of only one light is defined as a compensation amount between the two frequencies. In consideration of the superposition, the predetermined compensation amount can be determined by determining the compensation amount between the two frequencies for the light to be selected, out of a plurality of lights, and each of the other lights except for the light to be selected, respectively, and calculating the sum of the compensation amount between the two frequencies is determined.

The method for determining the predetermined compensation amount by determining the characteristic curve (FIG. 2B as described above), which shows the relationship between the frequency of the light to be selected and the frequency of the RF signal for each frequency interval of the lights to be selected and the number of the lights to be selected and the like, as described above, is effective when the frequencies and the number of the lights to be selected in the AOTF are fixed or in a relatively small number even when the number is changed. For example, it is effective when the arbitrary chs in arbitrary numbers are selected in a range from ch 5 to ch 9 out of a 24-wave WDM optical signal in which wavelengths of 24 optical signals are multiplexed.

Meanwhile, the method for determining the predetermined compensation amount for selecting the plurality of the lights based on the compensation amount between the two frequencies in the case of selecting the two lights, as described above, is effective when the frequencies and the number of the lights to be selected in the AOTF are optional or in the relatively large number even when these are changed. For example, it is effective when two arbitrary chs with arbitrary numbers are selected in a range from a ch 1 to ch 64 out of a 64-wave WDM optical signal in which wavelengths of 64 optical signals are multiplexed.

In the first embodiment, it is suitable that a detecting part is further provided at a port Pdr so as to detect optical power of the selected light, which is selected in the AOTF, and the control part 12 conducts a tracking by superimposing low-frequency signals on each of the plurality of the RF frequencies, which are determined in the compensation part 11, and adjusting each of the plurality of the RF frequencies to allow an output of the detecting part to maintain the maximum value of the output.

By conducting the tracking like as described above, it is possible to follow a change of an optimum frequency due to a temperature variation and the like during the operation of the AOTF.

Further, in the first embodiment, it is also suitable that the detecting part is further provided at the port Pdr so as to detect the optical power of the selected light which is selected in the AOTF. When the lights to be selected are increased, the control part 12 conducts the tracking by superimposing the low-frequency signals on each of the plurality of the RF frequencies which are already selected and by adjusting the RF frequency of the signal source 13 to allow the output of the detecting part to maintain the maximum value of the output, and determines the RF frequencies corresponding to the lights to be increased by adding/subtracting a predetermined compensation amount thereto/therefrom.

When lights to be selected in the AOTF are further increased, the RF frequencies for selection of the lights to be increased have little effect on the RF frequencies for selection of the lights which are already selected, and therefore these optimum frequencies can be followed by the tracking. For this reason, the compensation part 11 needs to carry out an operation of only the RF frequencies for selecting the lights to be increased. Therefore, the AOTF can be controlled with relatively less hardware. Further, the AOTF can be controlled in a relatively short time.

Moreover, the aforementioned AOTF may be used in a dropping/adding part for dropping and/or adding a predetermined optical signal from/to a WDM optical signal in which a plurality of optical signals with different wavelengths from each other are multiplexed, whereby an OADM including a generating part for generating the optical signal to be added and a receiving part for receiving/processing the optical signal to be dropped can be structured.

In the OADM like as described the above, optical power of the optical signal to be dropped/added is the same both for the case when one optical signal is dropped therefrom/added thereto and for the case when the plurality of these are dropped therefrom/added thereto and an optical signal-to-noise ratio is also the same for the case when one optical signal is dropped therefrom/added thereto and for the case when the plurality of these are dropped therefrom/added thereto.

The second embodiment is an embodiment of an optical communication system.

Figure 7:
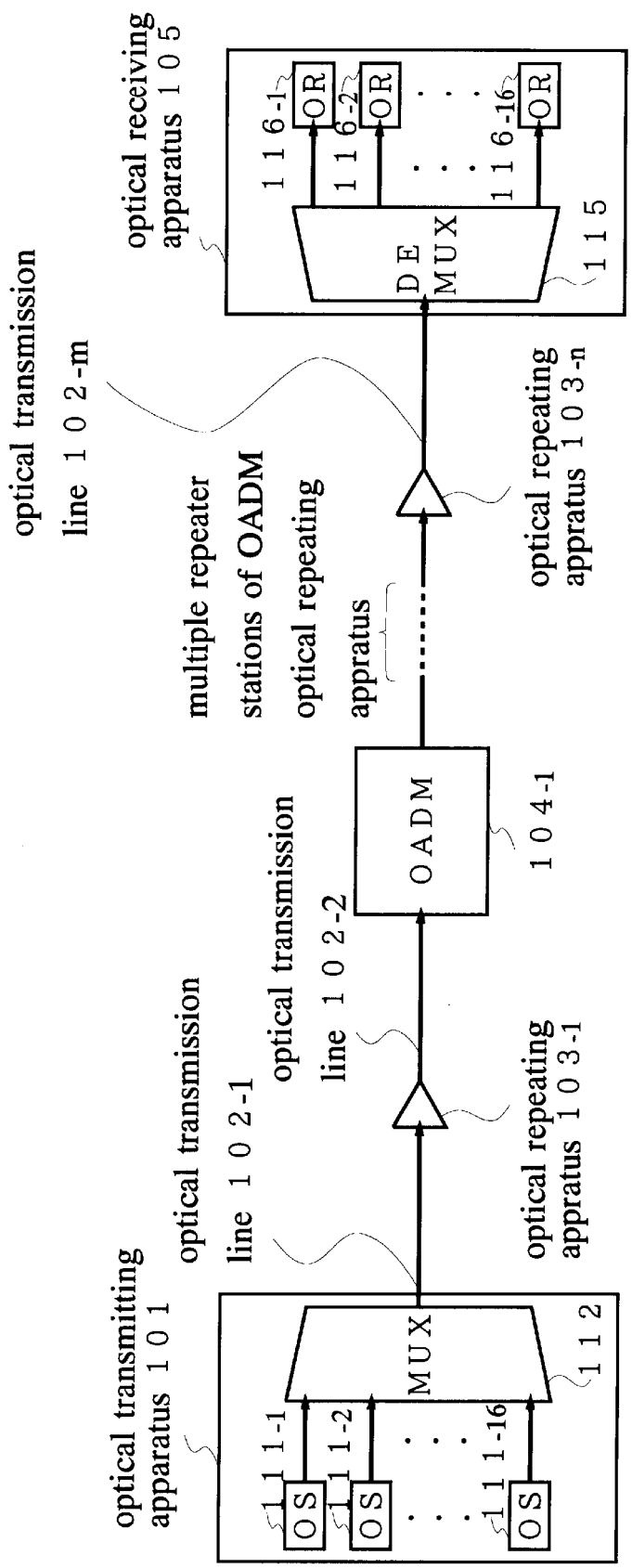
FIG. 7 is a schematic view showing the structure of an optical communication system according to a second embodiment.

As shown in FIG. 7, the optical communication system is structured by including an optical transmitting apparatus 101 which generates a 16-wave WDM optical signal, an optical transmission line 102 through which the WDM optical signal outputted from the optical transmitting apparatus 101 is transmitted, an OADM 104 which drops/adds an optical signal as a channel from/to the WDM optical signal transmitting through the optical transmission line 102, and an optical receiving apparatus 105 where the transmitted WDM optical signal is inputted to be received and processed. Moreover, in the optical communication system, an optical repeating apparatus 103 for compensating transmission loss which occurs to the WDM optical signal in the optical transmission line 102 is connected in the optical transmission line 102. Incidentally, the number of the OADM 104 and the optical repeating apparatus 103 provided in the optical transmission line 102 is not necessarily one for each, but a plurality of these may be provided as necessary.

The optical transmitting apparatus 101 is structured to include, for example, a plurality of optical senders (hereinafter abbreviated "OS") 111-1 to 111-16 for generating optical signals of respective channels of the WDM optical signal, and an optical multiplexer (hereinafter abbreviated "MUX") 112 for multiplexing wavelengths of the optical signals outputted from the OS 111-1 to 111-16. The number of the OSs 111 corresponds to the number of channels of the WDM optical signal, which is 16 in this embodiment. This also applies to the of optical receivers 116 which will be described later.

Each OS 111 can be structured by, for example, a semiconductor laser from which laser light with a predetermined wavelength is oscillated and an external modulator such as a Mach-Zehnder interferometer type optical modulator, which modulates the incident laser light according to information to be transmitted. The MUX 112 can use, for example, a dielectric multilayered film filter, which is one of the interference filters, an arrayed waveguide grating and the like.

The optical transmission line 102 is an optical fiber and various optical fibers such as a 1.3 $\mu$m band zero dispersion single mode fiber and a 1.5 $\mu$ band dispersion shift fiber can be used.

The optical receiving apparatus 105 is structured to include, for example, an optical demultiplexer (hereinafter abbreviated "DEMUX") 115 and optical receivers. (hereinafter abbreviated "OR") 116-1 to 116-16. The WDM optical signal is inputted from the optical transmission line 102 into the optical receiving apparatus 105, in which the wavelength of the WDM optical signal is demultiplexed in the DEMUX 115 to each of the optical signals corresponding to the respective channels. The demultiplexed optical signals of the respective channels are respectively inputted into the ORs 116-1 to 116-16, each of which is made of a photo diode, a demodulator and so on, to be received and processed.

The optical repeating apparatus 103 is structured to include, for example, an erbium-doped optical fiber amplifier which is structured by an erbium-doped optical fiber, a pump light source and so on. The erbium-doped optical fiber absorbs pump light (energy) supplied from the pump light source, whereby electrons of erbium ions are excited to form an inverted population of the electrons. When the optical signal to be amplified is inputted therein, induced radiation is caused to amplify the optical signal. Incidentally, an amplification band of the optical amplifying apparatus 103 is decided according to a wavelength band of the WDM optical signal, and the amplification band is dependent on the type of a rare earth element which is doped into the optical fiber, an excitation wavelength of the pump light source and the like. For example, an erbium-doped optical fiber amplifier whose excitation wavelength is 1.48 $\mu$m or 0.98 $\mu$m can amplify a 1.55 $\mu$m band.

Figure 8:
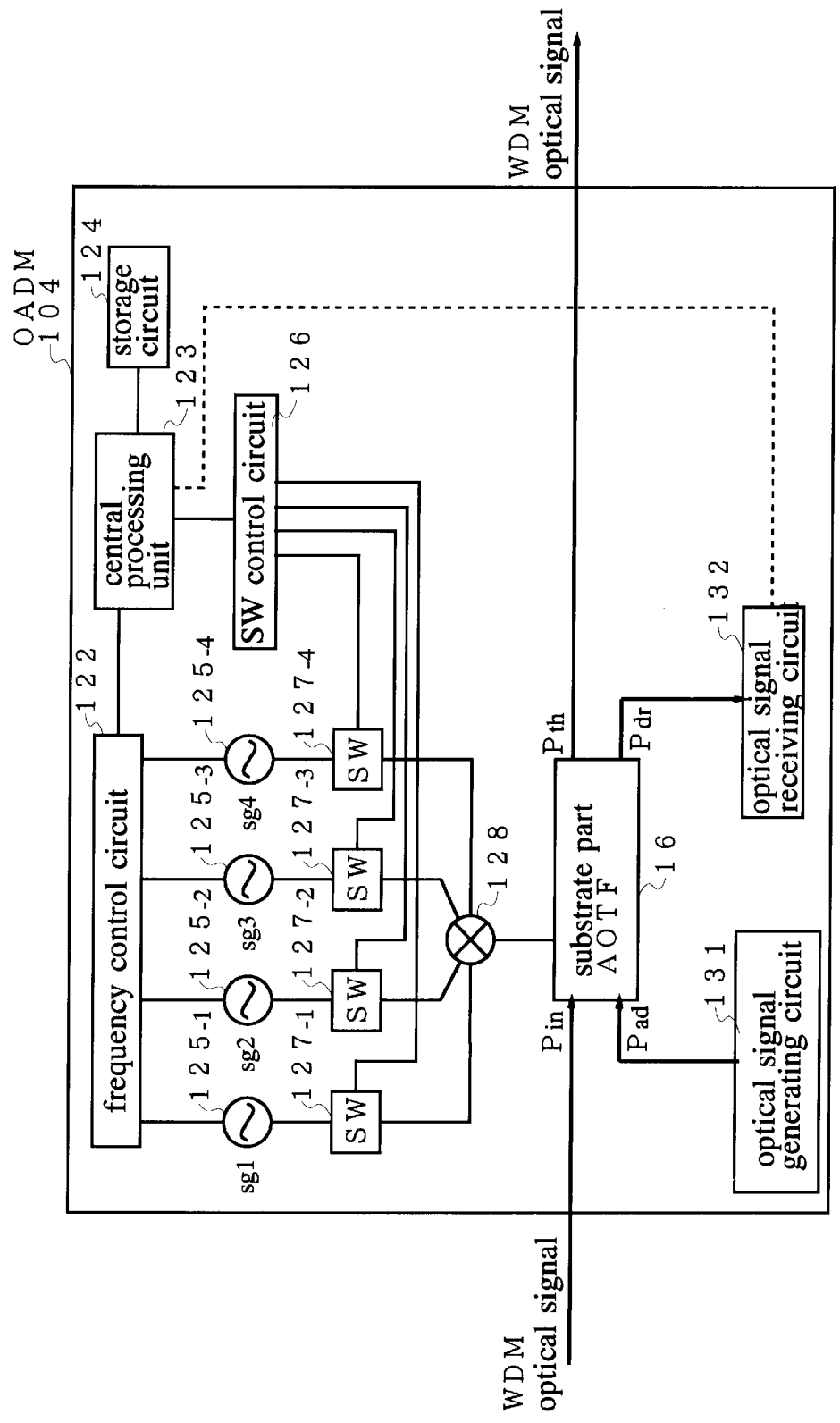
FIG. 8 is a schematic view showing the structure of an OADM in the optical communication system according to the second embodiment.

As shown in FIG. 8, the OADM 104 is structured to include a substrate part 16, a multiplexer 128, SWs 127, oscillators 125, an SW control circuit 126, a frequency control circuit 122, a central processing unit 123, a storage circuit 124, an added optical signal generating circuit 131 and a dropped optical signal receiving circuit 132. The substrate part 16 includes optical waveguides 51, 52, PBSs 53, 55, an IDT 54 and absorbers 56, 57, and the structure of the substrate part 16 is the same as that explained with reference to FIG. 18. Therefore, its explanation will be omitted. The WDM optical signal, which is inputted in the OADM 104 is inputted into a port Pin of the substrate part 16. An optical signal which is generated in the added optical signal generating circuit 131, is inputted into a port Pad of the substrate part 16.

A WDM optical signal, in which the wavelength of the optical signal inputted in the port Pin is multiplexed to the wavelengths of optical signals corresponding to chs, which are not selected in the substrate part 16, in particular, corresponding to transmitted chs, is outputted from a port Pth of the substrate part 16.

An optical signal, which corresponds to a ch which is selected and dropped in the substrate part 16, is outputted from a port Pdr of the substrate part 16 to be outputted to the dropped optical signal receiving circuit 132.

Meanwhile, the oscillators 125 oscillate a plurality of the RF signals with different frequencies from one another, in which the number of different frequencies corresponds to the number of optical signals which can be selected in the substrate part 16 at the same time. In the second embodiment, the four oscillators 125-1 to 125-4 are provided so that four optical signals can be selected at the same time. Further, it is possible to change the frequencies of the oscillators 125-1 to 125-4. The change of the oscillation frequencies of the oscillators 125-1 to 125-4 is controlled by the frequency control circuit 122.

The oscillators 125-1 to 125-4 may be allocated fixedly so that the oscillator 125-1 oscillates an RF frequency sgch1 for selecting light with a frequency corresponding to a ch 1, the oscillator 125-2 oscillates an RF frequency sgch2 for selecting light with a frequency corresponding to a ch 2, the oscillator 125-3 oscillates an RF frequency sgch3 for selecting light with a frequency corresponding to a ch 3, and the oscillator 125-4 oscillates an RF frequency sgch4 for selecting light with a frequency corresponding to a ch 4. Alternately, the oscillators 125 may be allocated selectively according to a ch number to be dropped/added, for example, the oscillator 125-1 may be used when one ch is dropped/added and the oscillator 125-2 may be used when two chs are dropped/added. In the second embodiment, the oscillators 125 are allocated fixedly.

Each of the oscillators 125-1 to 125-4 can use, a frequency synthesizer including, for example, a crystal oscillator, a reference frequency divider, a phase comparator, a low-pass filter, a voltage controlled oscillator, a variable frequency divider and the like. The frequency control circuit 122 can change the oscillation frequency of each of the oscillators 125-1 to 1254 by changing a dividing value of the variable frequency divider of the frequency synthesizer.

Outputs from the oscillators 125-1 to 125-4 are connected to the multiplexer 128 through the SWs 127-1 to 127-4, respectively. The SWs 127-1 to 127-4 are turned on/off by the control of the SW control circuit 126. After multiplexing the inputted RF signals, the multiplexer 128 supplies the RF signal to the IDT 54 of the substrate part 16.

The central processing unit 123 controls the frequencies of the RF signals, which are generated by the oscillators 125-1 to 125-4 via the frequency control circuit 122, and selects the RF signal to be outputted to the multiplexer 128 out of the oscillators 125-1 to 125-4 via the SW control circuit 126. Therefore, the RF signal to be supplied to the multiplexer 128 is a signal having one to four RF frequency component(s) according to on-off states of the SWs 127-1 to 127-4.

The storage circuit 124 stores data therein for sending to/receiving from the central processing unit 123 including, a program for processing performed by the central processing unit 123, reference frequencies sgb in the case of dropping/adding the optical signals of the respective chs separately, various data during the execution of the program and the like.

With respect to the reference frequencies sgb in the second embodiment, ch 1 is at a frequency of 174 MHz, ch 2 is at a frequency of 174.2 MHz, ch 3 is at a frequency of 174.4 MHz, and ch 4 is at a frequency of 174.6 MHz.

The added optical signal generating circuit 131 is a circuit for generating the optical signal which corresponds to the ch to be added in the OADM 104. The added optical signal generating circuit 131 is structured to include, for example, laser diodes, optical modulators, an optical multiplexer/demultiplexer and the like. Laser lights whose wavelengths correspond to the chs to be added are respectively emitted from the laser diodes, and the laser lights are externally modulated by the optical modulators according to information to be transmitted. The modulated laser lights are made incident on the optical multiplexer/demultiplexer, wavelengths thereof are multiplexed therein and thereafter, the laser light is outputted to the port Pad of the substrate part 16.

The dropped optical signal receiving circuit 132 is a circuit for receiving/processing the optical signal which corresponds to the ch dropped in the OADM 104. The dropped optical signal receiving circuit 132 is structured to include, for example, an optical branching coupler, a plurality of optical filters, a plurality of optical receivers and the like. The optical signal outputted from the port Pdr of the AOTF substrate is branched in the optical branching coupler with the number of branches corresponding to the number of the optical filters to be inputted into the optical filters, respectively. Each of the optical filters is a band pass optical filter, which transmits light with a predetermined wavelength, and a center wavelength of the transmission wavelength band for each of the optical filters is set to a respective ch of the WDM optical signal. Outputs from the respective optical filters are inputted into the optical receivers for demodulating the received optical signal to remove the information, respectively, to be received and processed therein. In the then-structured dropped optical signal receiving circuit 132, the optical receiver, which corresponds to the ch dropped in the OADM 104, is placed in a operation state, whereby the desired ch can be received and processed.

Next, the operation and effect of the second embodiment will be explained.

In the second embodiment, a predetermined compensation amount Δf is determined by the formula 2, in which a correction coefficient is 0.6. Further, with respect to the compensation amount between the two g (frequencies), simulation results of FIG. 3 to FIG. 5 and the like are formulated by a multiple regression analysis.

Figure 9:
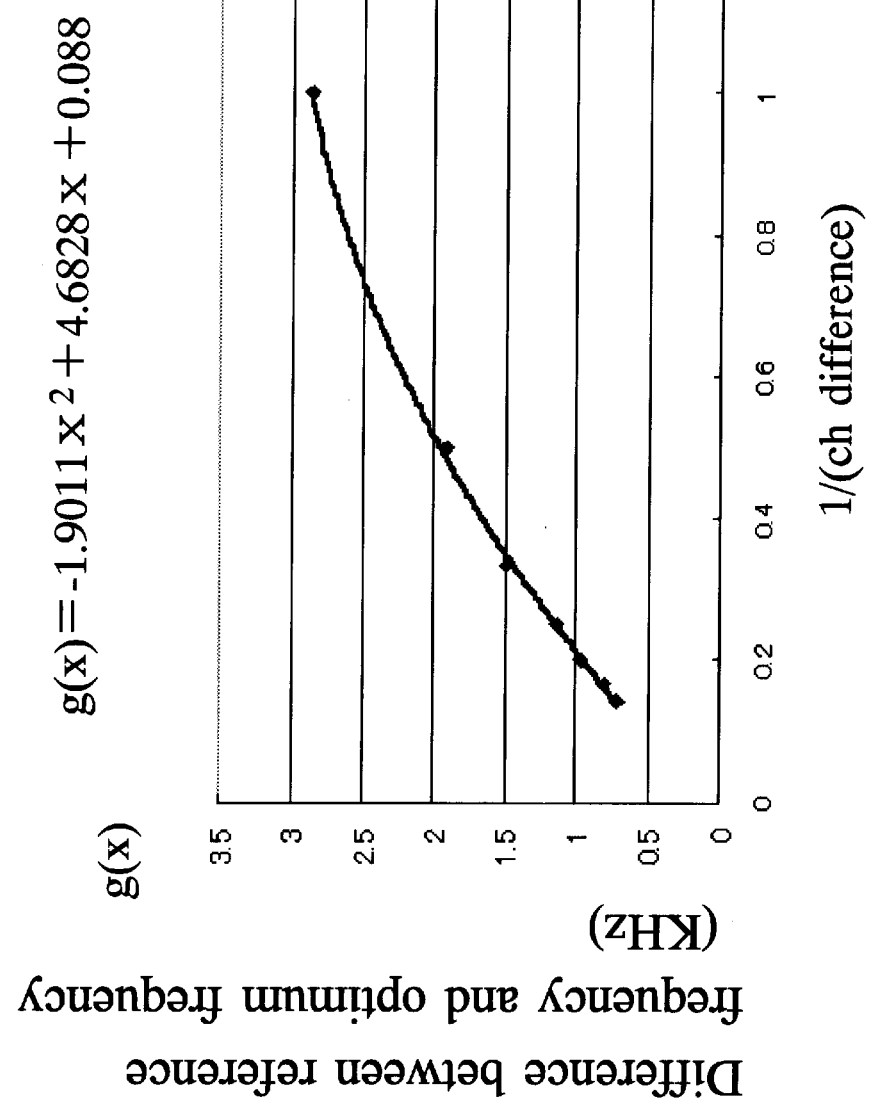
FIG. 9 is a diagram showing a relationship between the inverse of a frequency interval of channels and a to-be-compensated amount (compensation amount between the two) in an AOTF according to the second embodiment.

FIG. 9 is a view showing a relationship between the inverse of a frequency interval of channels and a compensation amount between the two frequencies in the AOTF according to the second embodiment.

In the formulation, the inverse of the frequency interval of the two channels which are selected in the AOTF at the same time, is set as a variable x in order to limit a defined area to $0 \leq x \leq 1$. The result of the formulation is as follows:

$$g(x)=1.9011x^2-4.6828x+0.088 \qquad \text{(Formula 3)}$$

The horizontal axes of FIGS. 10A and 10B show a frequency of light displayed in THz, and the vertical axes thereof show a difference between a reference frequency and an optimum frequency, that is, a compensation amount between the two g frequencies, displayed in kHz. FIG. 10A shows the case of selecting a ch 1 and ch 2 at the same time, and FIG. 10B shows the case of selecting a ch 1 to ch 4 at the same time.

As shown in FIGS. 10A and 10B, the measurement results (•) are in good agreement with the calculated results (○) using the formula 3 and the formula 2.

Incidentally, the calculated result is formulated by using a polynomial of second order because the polynomial of second order is accurate enough to use the AOTF, but the, calculated result may be formulated by using a polynomial of higher order, such as third or fourth order, for the higher accuracy.

When a ch, which is selected by a circuit (not shown) or the likes is designated, the central processing unit 123 first determines whether the number of the ch to be dropped/selected is one or not.

When the number of the ch to be dropped/selected is one, the central processing unit 123 transmits the reference frequency sgb to the frequency control circuit 122, allows the frequency control circuit 122 to control the oscillating 125 to have the reference frequency sgb, and controls the SW 127 corresponding to the ch to be dropped/selected to be turned on and the remaining SWs 127 to be turned off via the SW control circuit 126.

For example, when the ch to be dropped/added is the ch 2, the central processing unit 123 transmits a reference frequency sgb2 to the frequency control circuit 122. The frequency control circuit 122 controls the oscillator 125-2 to have the reference frequency sgb2. The central processing unit 123 allows the SW 127-2 corresponding to the ch 2 to be turned on, and other SWs 127-1, 127-3, 127-4 to be turned off.

Next, when the number of the ch to be dropped/selected is not one, that is, when plural chs are dropped/selected, the central processing unit 123 calculates each frequency interval x between the chs to be dropped/selected. The central processing unit 123 calculates compensation amounts between the two g(x) by using the calculated x and the formula 3. The central processing unit 123 calculates the predetermined amounts Δf by using the compensation amounts between the two g(x) and the formula 2. The central processing unit 123 calculates optimum frequencies sg by using the predetermined amounts Δf and the reference frequencies sgb.

For example, when the chs to be dropped/selected are the ch 1, ch 2 and ch 4, the central processing unit 123 calculates a frequency difference x12 between the ch 1 and ch 2, a frequency difference x14 between the ch 1 and ch 4, and a frequency difference x24 between the ch 2 and ch 4. By using x12, x14, x24 and the formula 3, the central processing unit 123 calculates compensation amounts between the two g (ch 1, ch 2), g (ch 1, ch 4), g (ch 2, ch 1), g (ch 2, ch 4), g (ch 4, ch 1) and g (ch 4, ch 2). By using these compensation amounts between the two g(x) and the formula 2, the central processing unit 123 calculates the predetermined compensation amounts Δf as follows:

$$g(ch\ 1, ch\ 2)=g(ch\ 2, ch\ 1)-1.9011(x12)^2+4.6828(x12)+0.088$$

$$g(ch\ 1, ch\ 4)=g(ch\ 4, ch\ 1)-1.9011(x14)^2+4.6828(x14)+0.088$$

$$g(ch\ 2, ch\ 4)=g(ch\ 4, ch\ 2)-1.9011(x24)^2+4.6828(x24)+0.088$$

$$\Delta fch\ 1, ch\ 1\ ch\ 2\ ch\ 4=0.6\times\{g(ch\ 1, ch\ 2)+g(ch\ 1, ch\ 4)\}$$

$$\Delta fch\ 2, ch\ 1\ ch\ 2\ ch\ 4=0.6\times\{g(ch\ 2, ch\ 1)+g(ch\ 2, ch\ 4)\}$$

$$\Delta fch\ 4, ch\ 1\ ch\ 2\ ch\ 4=0.6\times\{g(ch\ 4, ch\ 1)+g(ch\ 4, ch\ 2)\} \quad \text{(Formula 4)}$$

Using these predetermined compensation amounts Δf and the reference frequencies sgb1, sgb2, sgb4, the central processing unit 123 calculates optimum frequencies sgch1, sgch2, sgch4, while considering these signs. As explained in the first embodiment, the sign of the compensation amount Δf is decided according to an interaction effect being attracted toward the center of the frequencies of lights which are selected at the same time.

Next, the central processing unit 123 transmits the optimum frequency sg to the frequency control circuit 122, allows the frequency control circuit 122 to control the oscillator 125 to have the optimum frequency sg, and controls the SWs 127, which correspond to the chs to be dropped/selected, to turn on and the remaining SWs 127 to turn off via the SW control circuit 126.

For example, when the ch 1, ch 2 and ch 4 are dropped/selected as described above, the central processing unit 123 transmits the optimum frequencies sgch1, sgch2, sgch4 to the frequency control circuit 122. The frequency control circuit 122 controls the oscillator 125-1 to have the optimum frequency sgch1, the oscillator 125-2 to have the optimum frequency sgch2, and the oscillator 125-4 to have the optimum frequency sgch4. The central processing unit 123 allows the SWs 127-1, 127-2, 127-4 to be turned on, and the SW 127-3 to be turned off.

Thus, the RF signal including the plurality of optimum frequencies sg each of which is corrected by the compensation amount $\Delta f$ is supplied to the IDT 54 of the substrate part 16.

The substrate part 16 outputs the optical signal of the predetermined ch which corresponds to the optimum frequency sg from the WDM optical signal to the port Pdr. Further, the substrate part 16 supplies a new optical signal which is inputted in the port Pad to the WDM optical signal. This new optical signal can be inserted in the ch which becomes available by the dropping.

For example, when the ch 1, ch 2 and ch 4 are dropped/selected as described above, the RF signal including the optimum frequencies sgch1, sgch2 and sgch4 is supplied to the IDT 54 of the substrate part 16.

The substrate part 16 outputs the optical signal of the ch 1, the optical signal of the ch 2, and the optical signal of the ch 4 from the WDM optical signal to the port Pdr. Further, the substrate part 16 supplies a new optical signal which is inputted into the port Pad to the WDM optical signal. Since this new optical signal can be inserted in the ch 1, ch 2 and ch 4, it may be any of the optical signal of the ch 1 only, the optical signal of the ch 2 only, the optical signal of the ch 4 only, the optical signal of the ch 1 and ch 2, the optical signal of the ch 1 and ch 4, the optical signal of the ch 2 and ch 4, and the optical signal of the ch 1, ch 2 and ch 4.

Next, the central processing unit 123 is on standby until a ch which is newly selected by a circuit (not shown) or the like is designated, and when the ch is newly designated, it repeats the above operation to calculate an optimum RF frequency which corresponds to the newly selected ch.

Therefore, the RF signal with the optimum RF frequency which is corrected by the compensation amount $\Delta f$, is supplied to the IDT 54 of the substrate part 16, and also the ch having enough optical power can be dropped/added in the OADM 104.

FIG. 11A and FIG. 12A show spectrums of lights which are outputted from the respective ports, and FIG. 11B and FIG. 12B show optical power of respective chs of lights which are outputted from the respective ports. The horizontal axes of the respective drawings of FIGS. 11A, 11B, 12A and 12B show the ch (frequency of light) and the vertical axes thereof show transmission loss displayed in dB.

FIGS. 11A, 11B, 12A and 12B clearly show that the OADM 104 according to the second embodiment appropriately selects the frequency of the light corresponding to each ch. The ch having enough optical power can be dropped/added in the OADM 104 according to the second embodiment, and therefore variations between the respective chs do not result.

Figure 13:
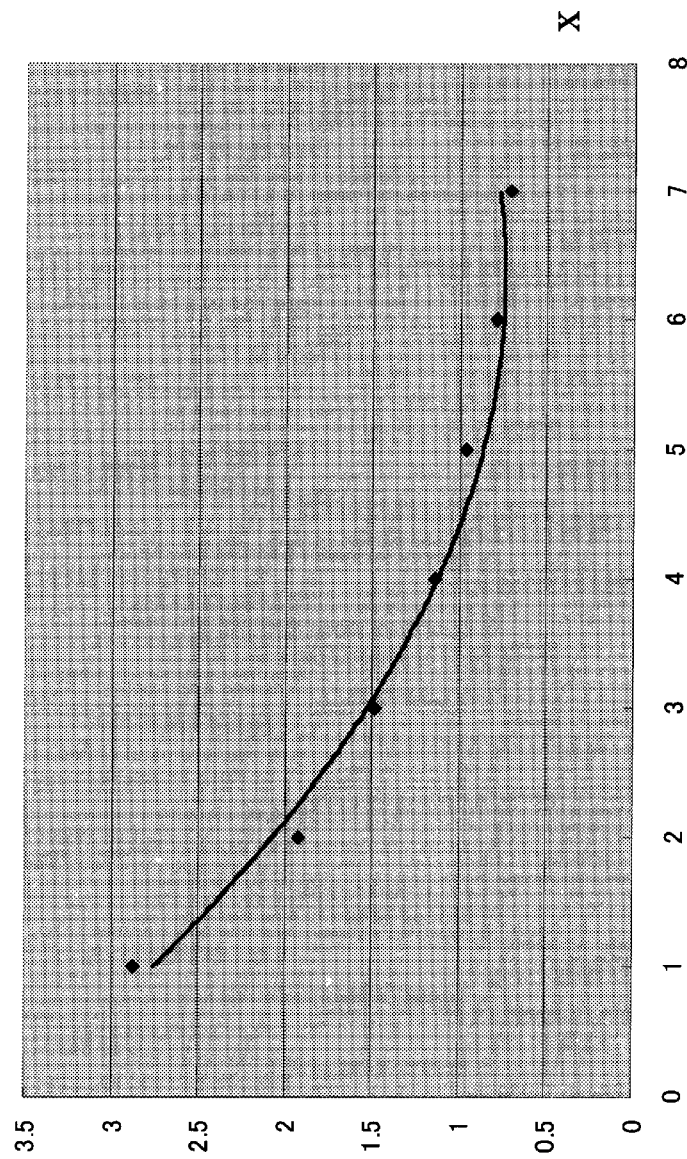
FIG. 13 is a diagram showing a relationship between the frequency interval of the channel and the compensation amount between the two in the AOTF according to the second embodiment.

Incidentally, as described above, the compensation amount between the two g is formulated using the formula 3, but simulation results of FIG. 3 to FIG. 5 or the like may be formulated by the multiple regression analysis using a formula 5 shown in FIG. 13.

$$g(x)=0.0714x^2-0.9021x+3.5925 \qquad \text{(Formula 5)}$$

Here, the variable x is a frequency interval of two channels which are selected in the AOTF at the same time. When the variable x is defined in that way, g (x) is almost inversely proportional to the square of x as in the formula 5.

Figure 14:
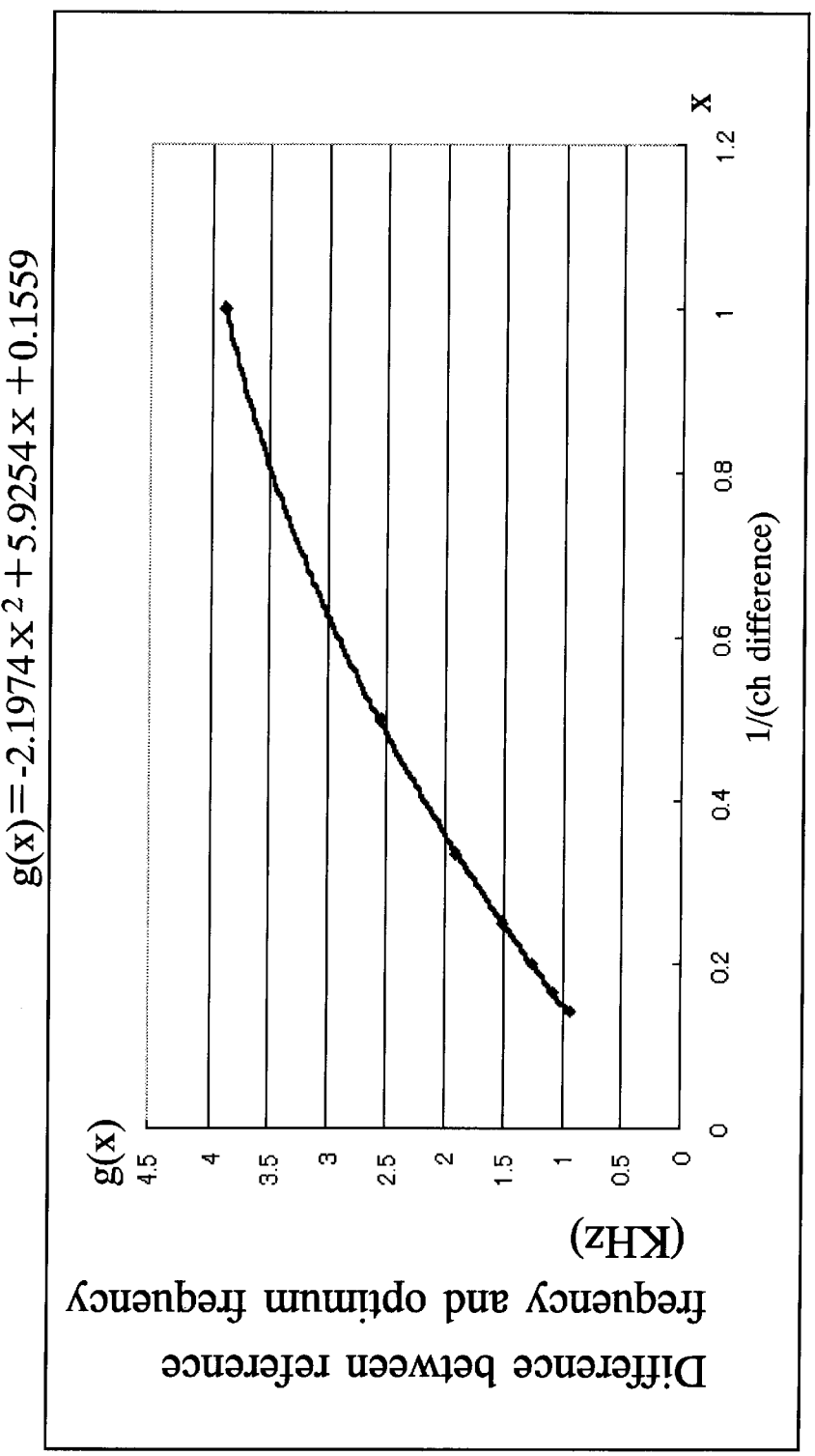
FIG. 14 is a diagram showing a relationship between the inverse of the frequency interval of the channel and the compensation amount between the two in an AOTF to which a surface acoustic wave in Gaussian curve distribution is applied.

Moreover, in the second embodiment, a surface acoustic wave which is given to the AOTF, is given a power distribution to obtain a cosine curve as explained in the first embodiment, but the surface acoustic wave may be given the power distribution to obtain a Gaussian curve from a start point (0 mm) to an end point of an action (about 70 mm). In this case, simulations corresponding to FIG. 3 to FIG. 5 are performed, and a relationship between the inverse of a frequency interval of channels and a compensation amount between the two in the AOTF, which corresponds to the formula 3, is analyzed. The analyzed result is shown in FIG. 14 and the result of the formulation is shown as a formula 6.

$$g(x)=2.1974x^2+5.9254x+0.1559 \qquad \text{(Formula 6)}$$

In this case, the correction coefficient is R=0.6.

Further, in the second embodiment, it is preferable that the OADM 104 further includes a tracking function for following the optimum frequency. In order to conduct the tracking, part of the output of the dropped optical signal from the dropped optical signal receiving circuit 132 is fed back to the central processing unit 123, as shown by the broken line in FIG. 8, and the central processing unit 123 controls as follows.

Figure 15:
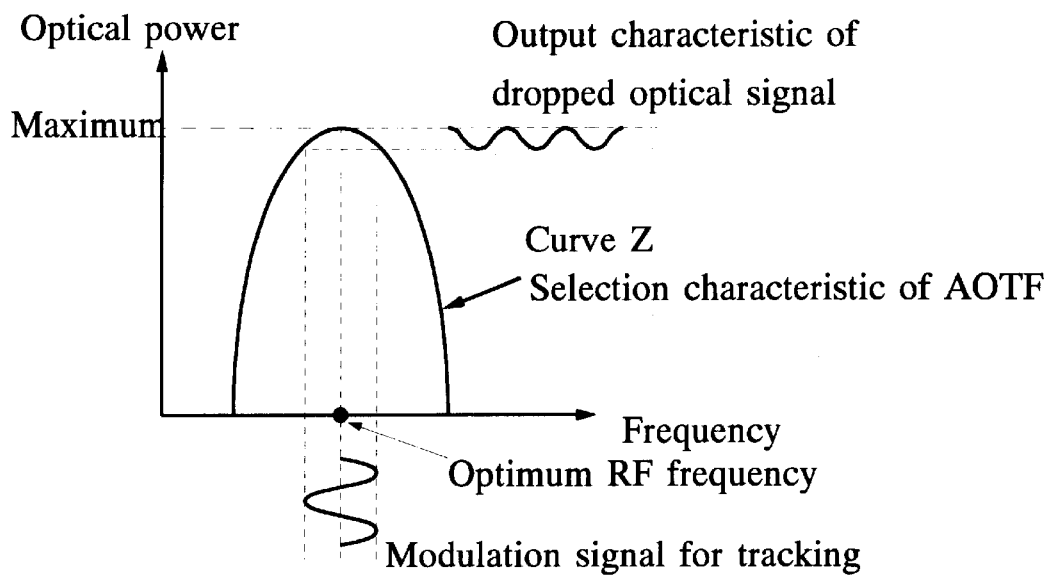
FIG. 15 is a diagram showing a relationship between a modulation signal for a tracking and a dropped optical signal.

A vertical axis of FIG. 15 indicates optical power and a horizontal axis thereof indicates a frequency of an RF signal. A curve Z indicates an output characteristic of the port Pdr of the AOTF, which is an upwardly protruded and almost symmetrical curve. In FIG. 15, the frequency of the RF signal with maximum optical power is the optimum frequency of the RF signal. A curve underneath the horizontal axis shows the modulation signal for the tracking which is in a sine wave, and a curve at the upper right of the curve Z shows the output of the dropped optical signal corresponding thereto.

The central processing unit 123 controls the frequency control circuit 122 to superimpose a low-frequency signal on the optimum frequency sg in consideration of the predetermined compensation amount $\Delta f$, which is determined by using the formula 2 and the formula 3. For example, a low-frequency signal at 1 kHz to 5 kHz is superimposed thereon. For this case, a signal at 3 kHz is superimposed.

Further, when a plurality of the optical signals are dropped, the low-frequency signals are respectively superimposed on the plurality of the RF frequencies for dropping the plurality of the optical signals.

The optical signal which is outputted from the port Pdr is received in the dropped optical signal receiving circuit 132 with the low frequency component included therein. In the dropped optical signal receiving circuit 132, the optical signal passes through the aforementioned optical filter, a part thereof is subjected to a photoelectric conversion by using the photo diode or the like, the low frequency component is extracted by the low-pass filter, and the result of the extraction is outputted to the central processing unit 123.

The central processing unit 123 controls each RF frequency to obtain the maximum result of the extraction. By the central processing unit 123 control, it is possible to maintain the optimum frequencies sg.

When the optical signals to be newly dropped/added are increased, the optimum frequencies sg are determined by the superposition when the tracking function is provided. For this reason, the RF frequencies for selecting the lights to be increased have little effect on the RF frequencies for selecting the lights which are already selected. Therefore, the optimum frequencies sg can be followed by the tracking. The central processing unit 123 needs to calculate only the RF frequencies for selecting the lights to be increased, by using the formula 2 and the formula 3. Therefore, the increase can be realized without substantially increasing the amount of hardware.

The third embodiment is an embodiment of an optical communication system.

In the second embodiment, the frequency of the RF signal is calculated according to the selection pattern of the optical signal. Meanwhile, in the third embodiment, a corresponding relationship between a selection pattern of an optical signal and a frequency of an RF signal is determined in advance according to logical calculation or actual measurement, and the frequency of the RF signal is decided by using the corresponding relationship.

Therefore, the structure of the optical communication system according to the third embodiment is the same as that shown in FIG. 7, and therefore explanation thereof will be omitted.

The structure of an OADM in the optical communication system according to the third embodiment is the same as that shown in FIG. 8, except for process contents of a central processing unit 123 and storage contents in a storage circuit 124, and therefore explanation thereof will be omitted.

In the storage circuit 124, is stored a table which directly/indirectly shows optimum frequencies in accordance with the selection pattern of the optical signal, a processing program of the central processing unit 123, various data during the execution of the program and the like.

Based on the processing program, the central processing unit 123 controls oscillation frequencies of oscillators 125-1 to 125-4 via a frequency control circuit 122 and controls SWs 127-1 to 127-4 via an SW control circuit 126.

Next, the operation and effect of the third embodiment will be explained.

When a pattern number is designated by a circuit (not shown) or the like, the central processing unit 123 refers to a table in the storage circuit 124, showing the relationship between the selection pattern and the compensation amount.

In FIG. 16, optimum frequencies sg are indirectly shown according to differences between reference frequencies sgb and the optimum frequencies sg (compensation amount $\Delta f$), and the differences between the reference frequencies sgb and the optimum frequencies sg correspond to the pattern number.

The reference frequencies sgb are the same as those of the second embodiment, and reference frequencies sgb1, sgb2, sgb3, sgb4 are also stored in the storage circuit 124.

Each box in FIG. 16 shows the pattern number, the selection pattern and the compensation amount $\Delta f$ (kHz) from left to right. The storage circuit 124 may store all of the boxes of the pattern number, the selection pattern and the compensation amount $\Delta f$, which are shown in FIG. 16, but it is suitable to store the boxes of the pattern number and the compensation amount $\Delta f$.

Since data for the compensation amount $\Delta f$, when none of the optical signals is selected in an OADM 104 (substrate part 16) is unnecessary, the number of the selection pattern is $2^N-1$, wherein the number of the optical signals which can be selected at the same time is N. FIG. 16 shows the case for the selection of four waves at the same time and the number of the selection patterns is $2^4-1=15$.

The central processing unit 123 retrieves the compensation amount $\Delta f$ from the box corresponding to the pattern number, and calculates the optimum frequency sg from the result of the retrieval and the reference frequency sgb.

For example, when a ch 1 and ch 4 are selected at the same time, a pattern number 7 is designated to the central processing unit 123. The central processing unit 123 retrieves the predetermined compensation amount $\Delta f$ from the box corresponding to the pattern number 7, and obtains the compensation amount −0.5 kHz for the oscillator 125-1 and the compensation amount +0.5 kHz for the oscillator 125-4 as the results of the retrieval.

The central processing unit 123 subtracts the compensation amount $\Delta f$−0.5 kHz from the reference frequency sgb1 for the ch 1. That is, it calculates sg1=174−(−0.0005) MHz. The central processing unit 123 subtracts the compensation amount $\Delta f$+0.5 kHz from the reference frequency sgb4 of the ch 4. That is, it calculates sg4=174.6−(+0.0005) MHz.

The central processing unit 123 adjusts the oscillation frequency of the oscillator 125-1 to obtain the calculated value sg1 via the frequency control circuit 122, and adjusts the oscillation frequency of the oscillator 125-4 to obtain the calculated value sg4 via the frequency control circuit 122.

The central processing unit 123 controls the SWs 127-1 to 127-4 via the SW control circuit 126 so that the SW 127-1 and the SW 127-4 are turned on and the SW 127-2 and the SW 127-3 are turned off.

Thus, the RF signal including sg1 and sg4 each of which is corrected by the compensation amount $\Delta f$ is supplied to an IDT 54 of the substrate part 16.

The substrate part 16 outputs the optical signal of the ch 1 and the optical signal of the ch 4 from the WDM optical signal to a port Pdr. Further, the substrate part 16 supplies a new optical signal to the WDM optical signal, which is inputted in a port Pad. This new optical signal can be inserted in the ch 1 and ch 4 which become available by the dropping and therefore, the optical signal can be inserted in ch 1 only, the optical signal can be inserted in ch 4 only, or the optical signal can be inserted in ch 1 and ch 4.

Moreover, when the ch 1, ch 2 and ch 3 are selected at the same time, for example, a pattern number 11 is designated to the central processing unit 123. The central processing unit 123 retrieves the compensation amount $\Delta f$ from the box corresponding to the pattern number 11, and obtains the compensation amount $\Delta f$−4 kHz for the oscillator 125-1, the compensation amount $\Delta f$ 0 kHz for the oscillator 125-2, the compensation amount $\Delta f$ +4 kHz of the oscillator 125-3 as the results for the retrieval.

The central processing unit 123 subtracts the compensation amount $\Delta f$−4 kHz from the reference frequency of the ch 1. That is, it calculates sg1=174−(−0.004) MHz. The central processing unit 123 subtracts the compensation amount $\Delta f$ 0 kHz from the reference frequency for the ch 2. That is, it calculates sg2=174.2−(0) MHz. The central processing unit 123 subtracts the compensation amount $\Delta f$+4 kHz from the reference frequency for the ch 3. That is, it calculates sg3=174.4−(+0.004) MHz.

Similarly to the above, the central processing unit 123 adjusts the oscillation frequencies of the oscillators 125-1, 125-2, 125-3 to obtain the calculated values sg1, sg2, sg3, respectively, and supplies the RF signal including sg1, sg2, sg3, each of which is corrected by the compensation amount Δf, to the IDT 54 of the substrate part 16.

Thus, the RF signal with the RF frequency which is corrected by the compensation amount Δf is supplied to the IDT 54 of the substrate part 16, and therefore the ch having enough optical power can be dropped/added in the OADM 104.

It should be noted that the table indirectly showing the optimum frequency sg according to the compensation amount Δf is stored in the third embodiment, but a table directly showing the selection pattern and the optimum frequency sg may be stored. In this case, the central processing unit 123 searches the table and transmits its result directly to the frequency control circuit 122.

Incidentally, the substrate part 16 shown in FIG. 1 is used in the first to the third embodiments, but the structure of the AOTF substrate is not limited to the above-described embodiments. For example, a substrate 26 of an AOTF as shown in FIG. 17 can be used.

Figure 17:
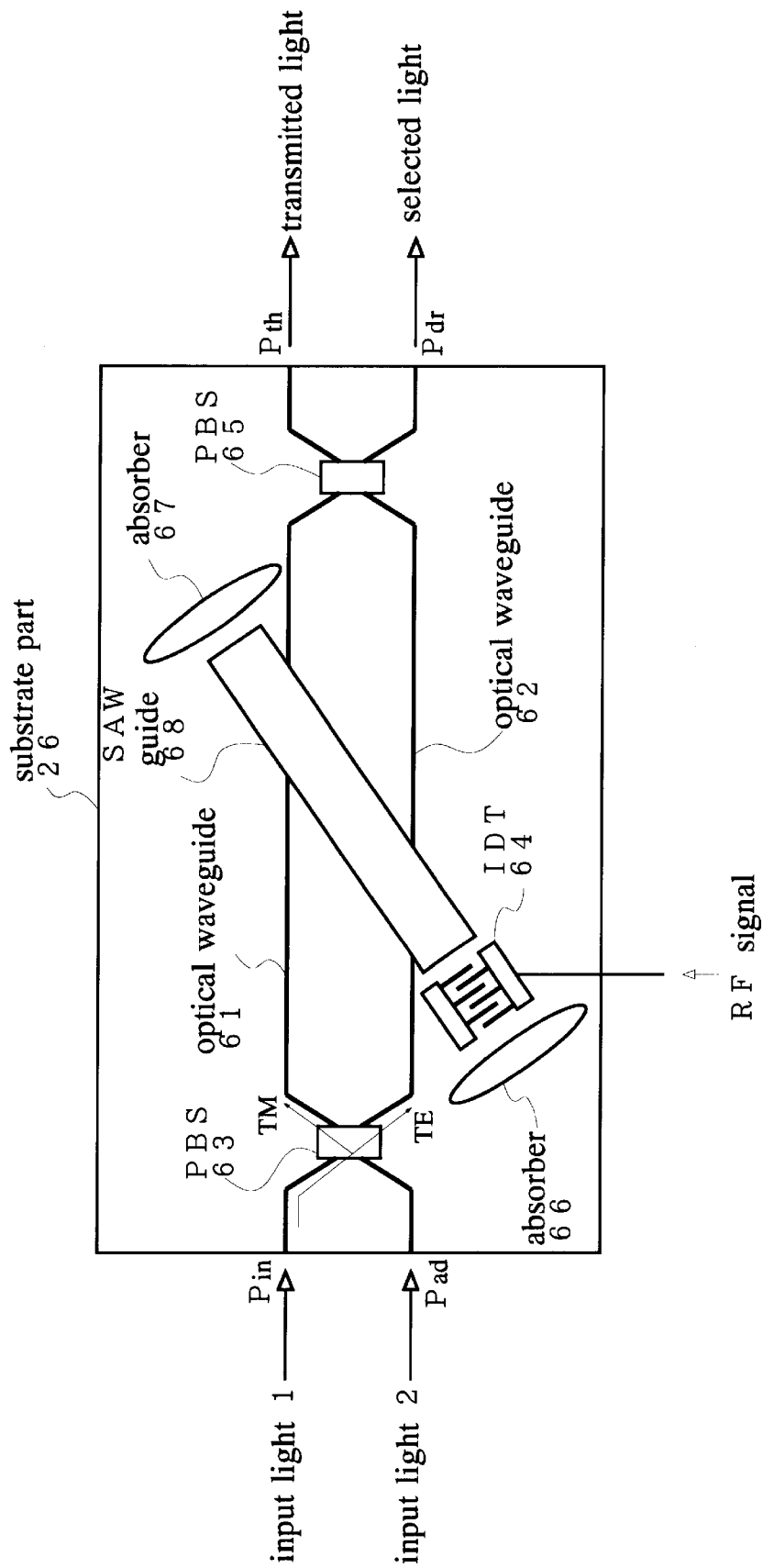
FIG. 17 is a schematic view showing the structure of another example of the AOTF.

In the AOTF shown in FIG. 17, optical waveguides 61, 62 are formed on the substrate 26 as a piezoelectric crystal. The optical waveguides 61, 62 intersect with one another at two points, and PBSs 63, 64 are provided at the intersections. Between the two intersections, an SAW guide 68 of a metallic film is formed on the two optical waveguides 61, 62 to intersect the two optical waveguides 61, 62, respectively. A surface acoustic wave is generated by applying an RF signal to an IDT 64, which propagates through the SAW guide 68. The IDT 64 is formed on the substrate 26 and on an extension of the SAW guide 68 in its longitudinal direction. Further, absorbers 66, 67 which absorb the surface acoustic wave are formed on the substrate 26 with the SAW guide 68 and the IDT 64 therebetween.

Figure 18:
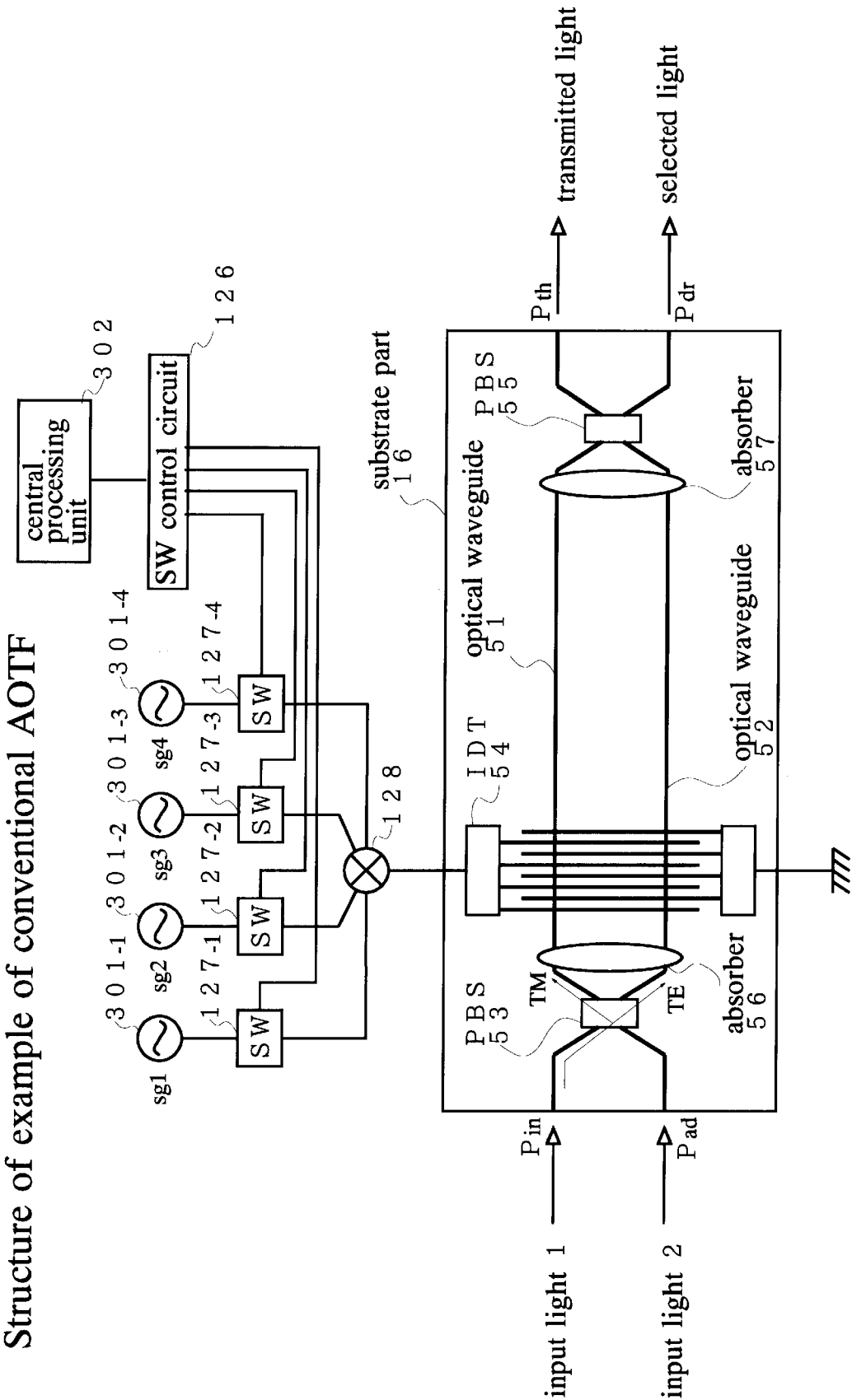
FIG. 18 is a schematic view showing the structure of an example of a conventional AOTF.

The operation and effect of the AOTF are the same as those of the AOTF shown in FIG. 18, and therefore explanations thereof are omitted.

What is claimed is:

1. An acousto-optical tunable filter for selectively outputting light with a frequency corresponding to an RF frequency of an RF signal, comprising:
    a signal source supplying said RF signal including at least one RF frequency to said acousto-optical tunable filter;
    a compensating section determining respective predetermined compensation amounts to compensate deviations occurring due to an interaction effect, when concurrently selecting a plurality of lights with different frequencies from each other in said acousto-optical tunable filter; and
    a controlling section controlling said signal source to apply the respective predetermined compensation amounts determined by said compensating section to a plurality of RF frequencies for oscillation.

2. The acousto-optical tunable filter according to claim 1, wherein said predetermined compensation amounts are determined based on an interval of RF frequencies for selecting only one light.

3. The acousto-optical tunable filter according to claim 1, wherein said predetermined compensation amounts are expressed as a polynomial of second order or more based on an interval of RF frequencies for selecting only one light.

4. The acousto-optical tunable filter according to claim 1, wherein when a difference between an RF frequency for selecting one light from two lights in a case of concurrently selecting the two lights in said acousto-optical tunable filter and an RF frequency corresponding to selecting only one light is defined as a to-be compensated amount, said predetermined compensation amounts are determined by determining the respective to-be compensated amounts for a light to be selected from said plurality of lights and all of the other lights except for the light to be selected, and by calculating a sum of the determined to-be-compensation amounts.

5. The acousto-optical tunable filter according to claim 1, wherein combinations of said plurality of lights are made in accordance with numbers and frequencies thereof so that said predetermined compensation amounts are determined by referring to a table showing a relationship between the combinations and RF frequencies for selecting the combinations.

6. The acousto-optical tunable filter according to claim 1, further comprising a detecting section detecting an optical power of light selected in said acousto-optical tunable filter, and wherein
    said controlling section superimposes a low-frequency signals on each of said plurality of RF frequencies with applied thereto the respective predetermined compensation amounts determined by said compensating section and conducts a tracking by adjusting each of said plurality of RF frequencies to allow said detecting section to maintain a maximum value of the output of the acousto-optical tunable filter.

7. The acousto-optical tunable filter according to claim 1, further comprising a detecting section detecting an optical power of light selected in said acousto-optical tunable filter, and wherein
    when a light to be selected is added, said controlling section superimposes a low frequency signal on each of said plurality of RF frequencies with applied thereto the respective predetermined compensation amounts determined by said compensating section and conducts a tracking by adjusting each of said plurality of RF frequencies to allow said detecting section to maintain a maximum value of the output of the acousto-optical tunable filter, and adds/subtracts said predetermined compensation amounts to/from an RF frequency corresponding to the light to be added.

8. A method of driving an acousto-optical tunable filter for selectively outputting light with a frequency corresponding to an RF frequency of an RF signal, comprising:
    determining, when concurrently selecting a plurality of lights with different frequencies from each other in said acousto-optical tunable filter, a predetermined compensation amount for one of the plurality of lights to compensate a deviation arising due to an interaction effect;
    repeating the determining so as to determine respective predetermined compensation amounts for all of said plurality of lights and to apply the respective compensation amounts to a plurality of RF frequencies;
    generating the RF signal including said plurality of RF frequencies with applied thereto the respective predetermined compensation amounts determined in the determining; and
    supplying the generated RF signal to said acousto-optical tunable filter.

9. The method of driving the acousto-optical tunable filter according to claim 8, wherein said predetermined compensation amount/amounts is/are determined based on an interval of RF frequencies for selecting only one light.

10. The method of driving the acousto-optical tunable filter according to claim 8, wherein when a difference between an RF frequency for selecting one light from two lights in a case of concurrently selecting the two lights in said acousto-optical tunable filter and RF frequency corresponding to selecting only one light is defined as a to-be-compensated amount, said predetermined compensation amount/amounts is/are inversely proportional to the square of an interval of RF frequencies for selecting only one light.

11. The method of driving the acousto-optical tunable filter according to claim 8, wherein when a difference between an RF frequency for selecting one light from two lights in a case of concurrently selecting the two lights in said acousto-optical tunable filter and RF frequency corresponding to selecting only one light is defined as a to-be-compensated amount, said predetermined compensation amount/amounts is/are determined by determining the respective to-be-compensated amounts for a light to be selected from said plurality of lights and all of the other lights except for the light to be selected, and by calculating a sum of the determined to-be compensation amounts.

12. The method of driving the acousto-optical tunable filter according to claim 8, wherein combinations of said plurality of lights are made in accordance with numbers and frequencies thereof so that said predetermined compensation amount/amounts is/are determined from a table showing a relationship between the combinations and the RF frequency for selecting the combinations.

13. The method of driving the acousto-optical tunable filter according to claim 8, further comprising:
    detecting an optical power of light selected in said acousto-optical tunable filter, and
    superimposing a low-frequency signals on each of said plurality of RF frequencies with applied thereto the respective predetermined compensation amounts determined in the determining and conducting a tracking by adjusting each of said plurality of RF frequencies to allow said detecting section in the detecting to maintain a maximum value of the output of said acousto-optical tunable filter.

14. The method of driving the acousto-optical tunable filter according to claim 8, further comprising:
    detecting an optical power of light selected in said acousto-optical tunable filter, and
    superimposing a low-frequency signals on each of said plurality of RF frequencies with applied thereto the respective predetermined compensation amounts determined in the determining and conducting a tracking by adjusting each of said plurality of RF frequencies to allow said detecting section in the detecting to maintain a maximum value of the output of said acousto-optical tunable filter, and adding/-subtracting said predetermined compensation amount to/from an RF frequency corresponding to the light to be added.

15. An optical add/drop multiplexer, comprising:
    a dropping/adding section dropping and/or adding a predetermined optical signal from/to a wavelength-division multiplexed optical signal in which a plurality of optical signals with different wavelengths from each other is wavelength-multiplexed;
    a generating section generating the optical signal to be added; and
    a receiving section receiving/processing the optical signal to be dropped, and wherein
    said dropping/adding section is an acousto-optical tunable filter selectively outputting light with a frequency corresponding to an RF frequency of an RF signal, including a signal source supplying the RF signal including at least one RF frequency to acousto-optical tunable filter;
    a compensating section determining respective predetermined compensation amounts to compensate deviations occurring due to an interaction effect, when concurrently selecting plurality of lights with different frequencies from each other in said acousto-optical tunable filter; and
    a controlling section controlling said signal source to apply the respective predetermined compensation amounts determined by said compensating section to plurality of RF frequencies for oscillation.

16. An acousto-optical tunable filter for selectively outputting light with a frequency corresponding to an RF frequency of an RF signal, comprising:
    a signal source supplying said RF signal including at least one RF frequency to said acousto-optical tunable filter;
    a compensating section determining a plurality of RF frequencies for selecting a plurality of lights with different frequencies by determining only one RF frequency corresponding to selecting only one light from the plurality of lights and adding/subtracting a predetermined compensation amount to/from the only one RF frequency, when selecting the plurality of lights in said acousto-optical tunable filter; and
    a controlling section controlling said signal source to oscillate said plurality of the RF frequencies determined by said compensating section, wherein said predetermined compensation amount is expressed as a polynomial of second order or more based on an interval of said RF frequencies for selecting the only one light.

17. An acousto-optical tunable filter for selectively outputting light with a frequency corresponding to an RF frequency of an RF signal, comprising:
    a signal source supplying said RF signal including at least one RF frequency to said acousto-optical tunable filter;
    a compensating section determining a plurality of RF frequencies for selecting a plurality of lights with different frequencies by determining only one RF frequency corresponding to selecting only one light from the plurality of lights and adding/subtracting a predetermined compensation amount to/from the only one RF frequency, when selecting the plurality of lights in said acousto-optical tunable filter;
    a controlling section controlling said signal source to oscillate said plurality of the RF frequencies determined by said compensating; and
    a detecting section detecting an optical power of light selected in said acousto-optical tunable filter, wherein said controlling section superimposes low-frequency signals on each of said plurality of RF frequencies determined by said compensating section and conducts a tracking by adjusting each of said plurality of RF frequencies to allow said detecting section to maintain a maximum value of the output of the acousto-optical tunable filter.

18. An acousto-optical tunable filter for selectively outputting light with a frequency corresponding to an RF frequency of an RF signal, comprising:
    a signal source supplying said RF signal including at least one RF frequency to said acousto-optical tunable filter;
    a compensating section determining a plurality of RF frequencies for selecting a plurality of lights with different frequencies by determining only one RF frequency corresponding to selecting only one light from the plurality of lights and adding/subtracting a predetermined compensation amount to/from the only one RF frequency, when selecting the plurality of lights in said acousto-optical tunable filter;

a controlling section controlling said signal source to oscillate said plurality of the RF frequencies determined by said compensating; and a detecting section detecting an optical power of light selected in said acousto-optical tunable filter, wherein when a light to be selected is added, said controlling section superimposes low frequency signals on each of said plurality of RF frequencies determined by said compensating section and conducts a tracking by adjusting each of said plurality of RF frequencies to allow said detecting section to maintain a maximum value of the output of the acousto-optical tunable filter, and adds/subtracts said predetermined compensation amount to/from an RF frequency corresponding to the light to be added.

19. A method of driving the acousto-optical tunable filter for selectively outputting light with a frequency corresponding to an RF frequency of an RF signal, comprising:

determining a plurality of RF frequencies selecting a plurality of lights with different frequencies by determination of only one RF frequency corresponding to selecting of only one light from the plurality of lights and adding/subtracting a predetermined compensation amount to/from the only one RF frequency, when selecting the plurality of lights in said acousto-optical tunable filter;

repeating the determining for said plurality of the lights so as to determine all of said plurality of RF frequencies for selecting said plurality of lights;

generating the RF signal including said plurality of RF frequencies determined in the determining; and supplying the generated RF signal to said acousto-optical tunable filter, wherein when a difference between an RF frequency for selecting one light from two lights in a case of selecting the two lights in said acousto-optical tunable filter and the only one RF frequency corresponding to selecting only one light is defined as a to-be-compensated amount, said predetermined compensation amount is inversely proportional to the square of an interval of said RF frequencies for selecting the only one light.

20. A method of driving the acousto-optical tunable filter for selectively outputting light with a frequency corresponding to an RF frequency of an RF signal, comprising:

determining a plurality of RF frequencies selecting a plurality of lights with different frequencies by determination of only one RF frequency corresponding to selecting of only one light from the plurality of lights and adding/subtracting a predetermined compensation amount to/from the only one RF frequency, when selecting the plurality of lights in said acousto-optical tunable filter;

repeating the determining for said plurality of the lights so as to determine all of said plurality of RF frequencies for selecting said plurality of lights;

generating the RF signal including said plurality of RF frequencies determined in the determining;

supplying the generated RF signal to said acousto-optical tunable filter;

detecting an optical power of light selected in said acousto-optical tunable filter; and superimposing low-frequency signals on each of said plurality of RF frequencies determined in the determining and conducting a tracking by adjusting each of said plurality of RF frequencies to allow said detecting section in the detecting to maintain a maximum value of the output of said acousto-optical tunable filter.

21. A method of driving the acousto-optical tunable filter for selectively outputting light with a frequency corresponding to an RF frequency of an RF signal, comprising:

determining a plurality of RF frequencies selecting a plurality of lights with different frequencies by determination of only one RF frequency corresponding to selecting of only one light from the plurality of lights and adding/subtracting a predetermined compensation amount to/from the only one RF frequency, when selecting the plurality of lights in said acousto-optical tunable filter;

repeating the determining for said plurality of the lights so as to determine all of said plurality of RF frequencies for selecting said plurality of lights;

generating the RF signal including said plurality of RF frequencies determined in the determining;

supplying the generated RF signal to said acousto-optical tunable filter;

detecting an optical power of light selected in said acousto-optical tunable filter; and superimposing low-frequency signals on each of said plurality of RF frequencies determined in the determining and conducting a tracking by adjusting each of said plurality of RF frequencies to allow said detecting section in the detecting to maintain a maximum value of the output of said acousto-optical tunable filter, and adding/subtracting said predetermined compensation amount to/from an RF frequency corresponding to the light to be added.

22. An acousto-optical tunable filter for concurrently and selectively outputting lights with different frequencies corresponding to a plurality of RF frequencies from a signal source applied to the acousto-optical tunable filter, comprising:

a compensating section determining compensation amounts to offset deviations produced by an interaction effect of the plurality of RF frequencies based on the different frequencies of the lights selected; and a controlling section controlling the signal source to apply the determined compensation amounts by the compensating section to the applied RF frequencies.

23. A method of driving an acousto-optical tunable filter concurrently and selectively outputting lights with different frequencies corresponding to a plurality of RF frequencies from a signal source applied to the acousto-optical tunable filter, comprising:

determining compensation amounts to offset deviations produced by an interaction effect of the plurality of RF frequencies based on the different frequencies of the lights selected; and controlling the signal source to apply the determined compensation amounts to the applied RF frequencies.

24. The method of driving an acousto-optical tunable filter according to claim 23, wherein the determining of the compensation amounts comprises:

determining the plurality of RF frequencies to select the lights with the different frequencies by determining an RF frequency corresponding to only one RF frequency and adding/subtracting a predetermined compensation amount to/from the only one RF frequency, when selecting more than one frequency of the lights in the acousto-optical tunable filter; and repeating the determining of the plurality of RF frequencies so as to determine all of the plurality of RF frequencies to select the lights with the different frequencies.

25. The method of driving an acousto-optical tunable filter according to claim 24, wherein the controlling of the signal source comprises:

generating the plurality of RF frequencies based on a result of the repeating; and supplying the generated RF signal to the acousto-optical tunable filter.

26. An acousto-optical tunable filter for concurrently and selectively outputting lights with different frequencies corresponding to a plurality of RF frequencies from a signal source applied to the acousto-optical tunable filter, comprising:

compensating means for determining compensation amounts to offset deviations produced by an interaction effect of the plurality of RF frequencies based on the different frequencies of the lights selected; and means for controlling the signal source to apply the determined compensation amounts by the compensating means to the applied RF frequencies.

27. An apparatus, comprising:

acousto-optical tunable filter concurrently and selectively outputting lights with different frequencies corresponding to a plurality of RF frequencies applied to the acousto-optical tunable filter; and means for determining compensation amounts to offset deviations produced by an interaction effect of the plurality of RF frequencies based on the different frequencies of the lights selected and for applying the determined compensation amounts to the applied RF frequencies.

28. An apparatus, comprising:

an acousto-optical tunable filter concurrently and selectively outputting lights with different frequencies corresponding to a plurality of RF frequencies applied to the acousto-optical tunable filter; and compensation device determining compensation amounts to offset deviations produced by an interaction effect of the plurality of RF frequencies based on the different frequencies of the lights selected and applying the determined compensation amounts to the applied RF frequencies.

29. A method, comprising:

concurrently and selectively outputting lights with different frequencies from an acousto-optical tunable filter corresponding to a plurality of RF frequencies applied to the acousto-optical tunable filter;

determining compensation amounts to offset deviations produced by an interaction effect of the plurality of RF frequencies based on the different frequencies of the lights selected; and applying the determined compensation amounts to the applied RF frequencies.

* * * * *